US012762645B2

(12) United States Patent
Park et al.

(10) Patent No.: US 12,762,645 B2
(45) Date of Patent: Oct. 13, 2026

(54) SUPER-RESOLUTION ON TEXT-TO-IMAGE SYNTHESIS WITH GANS

(71) Applicant: ADOBE INC., San Jose, CA (US)

(72) Inventors: Taesung Park, San Francisco, CA (US); Minguk Kang, Pohang-si (KR); Richard Zhang, Burlingame, CA (US); Junyan Zhu, Pittsburgh, PA (US); Elya Shechtman, Seattle, WA (US); Sylvain Paris, Jamaica Plain, MA (US)

(73) Assignee: ADOBE INC., San Jose, CA (US)

( * ) Notice: Subject to any disclaimer, the term of this patent is extended or adjusted under 35 U.S.C. 154(b) by 394 days.

(21) Appl. No.: 18/171,046

(22) Filed: Feb. 17, 2023

(65) Prior Publication Data

US 2024/0281924 A1 Aug. 22, 2024

(51) Int. Cl.
*G06T 3/4046* (2024.01)
*G06T 3/4053* (2024.01)

(52) U.S. Cl.
CPC .......... *G06T 3/4046* (2013.01); *G06T 3/4053* (2013.01)

(58) Field of Classification Search
CPC ..... G06T 3/4046; G06T 3/4053; G06T 11/00; G06T 5/60; G06T 2207/20084; G06T 2211/441; G06N 3/0455; G06N 3/0464; G06N 3/082; G06N 3/0475
See application file for complete search history.

(56) References Cited

U.S. PATENT DOCUMENTS 10,713,821 B1 7/2020 Surya et al.
12,020,400 B2 6/2024 Hsieh et al.
12,346,995 B2 7/2025 Liu et al.
2017/0024855 A1* 1/2017 Liang .................... G06T 3/4053
2018/0240257 A1 8/2018 Li et al.
2019/0095730 A1* 3/2019 Fu .......................... G06V 10/82
2020/0242823 A1 7/2020 Gehlaut et al.
2020/0242964 A1 7/2020 Wu
2021/0027169 A1 1/2021 Kanan et al.
(Continued)

FOREIGN PATENT DOCUMENTS

CN 111062865 A 4/2020
CN 118521474 A 8/2024
(Continued)

OTHER PUBLICATIONS

H. Zhang et al., "StackGAN: Text to Photo-realistic Image Synthesis with Stacked Generative Adversarial Networks," arXiv.org, 2017. https://arxiv.org/abs/1612.03242 (Year: 2017).*
(Continued)

*Primary Examiner* — Vu Le
*Assistant Examiner* — Rachel Anne Ometz
(74) *Attorney, Agent, or Firm* — F. CHAU & ASSOCIATES, LLC

(57) ABSTRACT

Systems and methods for image processing are described. Embodiments of the present disclosure obtain a low-resolution image and a text description of the low-resolution image. A mapping network generates a style vector representing the text description of the low-resolution image. An adaptive convolution component generates an adaptive convolution filter based on the style vector. An image generation network generates a high-resolution image corresponding to the low-resolution image based on the adaptive convolution filter.

19 Claims, 17 Drawing Sheets

(56) References Cited

U.S. PATENT DOCUMENTS

| | | | | |
|---|---|---|---|---|
| 2021/0342984 | A1 | 11/2021 | Lin et al. | |
| 2022/0038620 | A1 | 2/2022 | Demers | |
| 2022/0108417 | A1* | 4/2022 | Liu | G06T 1/0007 |
| 2022/0114698 | A1 | 4/2022 | Liu | |
| 2022/0130499 | A1 | 4/2022 | Zhou et al. | |
| 2022/0335572 | A1 | 10/2022 | Seresht et al. | |
| 2023/0075891 | A1 | 3/2023 | Zheng et al. | |
| 2023/0081171 | A1* | 3/2023 | Zhang | G06T 11/00 382/157 |
| 2023/0082567 | A1* | 3/2023 | Suresha | G06N 3/09 382/100 |
| 2023/0108422 | A1 | 4/2023 | Brauer et al. | |
| 2023/0154161 | A1 | 5/2023 | Pham et al. | |
| 2023/0177810 | A1 | 6/2023 | Xu et al. | |
| 2023/0230198 | A1 | 7/2023 | Zhang et al. | |
| 2024/0037732 | A1* | 2/2024 | Gong | G06T 3/4046 |
| 2024/0037822 | A1* | 2/2024 | Aberman | G06F 3/04845 |
| 2024/0135683 | A1 | 4/2024 | Li | |
| 2024/0171788 | A1 | 5/2024 | Kreis et al. | |
| 2024/0185035 | A1 | 6/2024 | Yu et al. | |
| 2024/0193726 | A1* | 6/2024 | Misra | G06T 7/73 |
| 2024/0221235 | A1 | 7/2024 | Gafni et al. | |
| 2024/0264718 | A1 | 8/2024 | Benedetto et al. | |
| 2024/0265204 | A1 | 8/2024 | Meeks et al. | |
| 2024/0282016 | A1 | 8/2024 | Liu et al. | |
| 2025/0209712 | A1 | 6/2025 | Svitov et al. | |

FOREIGN PATENT DOCUMENTS

| | | | | |
|---|---|---|---|---|
| GB | 2621492 | A1 | 2/2024 | |
| KR | 20210121537 | A * | 10/2021 | G06N 3/0464 |
| WO | WO2022156350 | A1 | 7/2022 | |

OTHER PUBLICATIONS

Ni et al., "Instance Mask Embedding and Attribute-Adaptive Generative Adversarial Network for Text-to-Image Synthesis", IEEE Access Special Section on Integrative Computer Vision and Multimedia Analytics (Year: 2020).*

Hui et al., "Image Generation Method of Bird Text Based on Improved StackGAN", 2022 7th International Conference on Image, Vision and Computing (Year: 2022).*

Han et al., "Multi-level U-net network for image super-resolution reconstruction", Displays 73 (2022) 102192 (Year: 2022).*

Zhang et al., "StackGAN++: Realistic Image Synthesis with Stacked Generative Adversarial Networks", arXiv: 1710.10916v3 (Year: 2018).*

Tao et al., "DE-Net: Dynamic Text-guided Image Editing Adversarial Networks", arXiv:2206.01160v2 (Year: 2022).*

Li, et al., "Text to Realistic Image Generation with Attentional Concatenation Generative Adversarial Networks", Discrete Dynamics in Nature and Society, vol. 2020, Article ID 6452536, Oct. 2020, 10 pages.

Combined Search and Examination Report dated Jun. 18, 2024 in corresponding United Kingdom Patent Application No. 2319189.3 (7 pages).

10Karras, et al., "Analyzing and Improving the Image Quality of StyleGAN", arXiv preprint arXiv:1912.04958v2 [cs.CV] Mar. 23, 2020, 21 pages.

11Kim, et al., "The Lipschitz Constant of Self-Attention", arXiv preprint arXiv:2006.04710v2 [stat.ML] Jun. 9, 2021, 26 pages.

12Kumari, et al., "Ensembling Off-the-shelf Models for GAN Training", arXiv preprint arXiv:2112.09130v3 [cs.CV] May 4, 2022, 35 pages.

13Lee, et al., "ViTGAN: Training GANs with Vision Transformers", In International Conference on Learning Representations (ICLR), Apr. 2022, 18 pages.

14Liang, et al., "CPGAN: Content-Parsing Generative Adversarial Networks for Text-to-Image Synthesis", arXiv preprint arXiv:1912.08562v2 [cs.CV] Jul. 12, 2020, 18 pages.

15Miyato, et al., "cGANs with Projection Discriminator", arXiv preprint arXiv:1802.05637v2 [cs.LG] Aug. 15, 2018, 21 pages.

16Nichol, et al., "GLIDE: Towards Photorealistic Image Generation and Editing with Text-Guided Diffusion Models", arXiv preprint arXiv:2112.10741v3 [cs.CV] Mar. 8, 2022, 20 pages.

17van den Oord, et al., "Representation Learning with Contrastive Predictive Coding", arXiv preprint arXiv:1807.03748v2 [cs.LG] Jan. 22, 2019, 13 pages.

18Park, et al., "Contrastive Learning for Unpaired Image-to-Image Translation", arXiv preprint arXiv:2007.15651v3 [cs.CV] Aug. 20, 2020, 29 pages.

19Radford, et al., "Learning Transferable Visual Models from Natural Language Supervision", arXiv preprint arXiv:2103.00020v1 [cs.CV] Feb. 26, 2021, 48 pages.

1Brock, et al., "Large Scale GAN Training for High Fidelity Natural Image Synthesis", arXiv preprint arXiv:1809.11096v2 [cs.LG] Feb. 25, 2019, 35 pages.

20Radford, et al., "Unsupervised Representation Learning with Deep Convolutional Generative Adversarial Networks", arXiv preprint arXiv:1511.06434v2 [cs.LG] Jan. 7, 2016, 16 pages.

21Ramesh, et al., "Hierarchical Text-Conditional Image Generation with CLIP Latents", arXiv preprint arXiv:2204.06125v1 [cs.CV] Apr. 13, 2022, 27 pages.

22Reed, et al., "Generative Adversarial Text to Image Synthesis", arXiv preprint arXiv:1605.05396v2 [cs.NE] Jun. 5, 2016, 10 pages.

23Rombach, et al., "High-Resolution Image Synthesis with Latent Diffusion Models", arXiv preprint arXiv:2112.10752v2 [cs.CV] Apr. 13, 2022, 45 pages.

24Saharia, et al., "Photorealistic Text-to-Image Diffusion Models with Deep Language Understanding", arXiv preprint arXiv:2205.11487v1 [cs.CV] May 23, 2022, 46 pages.

25Sauer, et al., "StyleGAN-XL: Scaling StyleGAN to Large Diverse Datasets", arXiv preprint arXiv:2202.00273v2 [cs.LG] May 5, 2022, 19 pages.

26Tanjim, et al., "DynamicRec: A Dynamic Convolutional Network for Next Item Recommendation", In Proceedings of the 29th ACM International Conference on Information and Knowledge Management (CIKM-2020), pp. 2237-2240, 2020, 4 pages.

27Tao, et al., "DF-GAN: A Simple and Effective Baseline for Text-to-Image Synthesis", arXiv preprint arXiv:2008.05865v4 [cs.CV] Oct. 15, 2022, 11 pages.

28Vaswani, et al., "Attention is All You Need", arXiv preprint arXiv:1706.03762v5 [cs.CL] Dec. 6, 2017, 15 pages.

29Wang, et al., "Understanding Contrastive Representation Learning through Alignment and Uniformity on the Hypersphere", arXiv preprint arXiv:2005.10242v10 [cs.LG] Aug. 15, 2022, 41 pages.

2De Brabandere, et al., "Dynamic Filter Networks", arXiv preprint arXiv:1605.09673v2 [cs.LG] Jun. 6, 2016, 14 pages.

30Wu, et al., "Pay Less Attention with Lightweight and Dynamic Convolutions", arXiv preprint arXiv:1901.10430v2 [cs.CL] Feb. 22, 2019, 14 pages.

31Xu, et al., "AttnGAN: Fine-Grained Text to Image Generation with Attentional Generative Adversarial Networks", In IEEE Conference on Computer Vision and Pattern Recognition (CVPR), 2018, pp. 1316-1324, 9 pages.

32Yu, et al., "Scaling Autoregressive Models for Content-Rich Text-to-Image Generation", arXiv preprint arXiv:2206.10789v1 [cs.CV] Jun. 22, 2022, 49 pages.

33Zhang, et al., "Cross-Modal Contrastive Learning for Text-to-Image Generation", arXiv preprint arXiv:2101.04702v5 [cs.CV] Apr. 14, 2022, 19 pages.

34Zhang, et al., "StackGAN: Text to Photo-realistic Image Synthesis with Stacked Generative Adversarial Networks", arXiv preprint arXiv:1612.03242v2 [cs.CV] Aug. 5, 2017, 14 pages.

35Zhang, et al., "The Unreasonable Effectiveness of Deep Features as a Perceptual Metric", arXiv preprint arXiv:1801.03924v2 [cs.CV] Apr. 10, 2018, 14 pages.

36Zhao, et al., "Large Scale Image Completion via Co-Modulated Generative Adversarial Networks", arXiv preprint arXiv:2103.10428v1 [cs.CV] Mar. 18, 2021, 25 pages.

37Zhu, et al., "DM-GAN: Dynamic Memory Generative Adversarial Networks for Text-to-Image Synthesis", arXiv preprint arXiv:1904.01310v1 [cs.CV] Apr. 2, 2019, 9 pages.

(56) References Cited

OTHER PUBLICATIONS

3Deng, et al., "Imagenet: A Large-Scale Hierarchical Image Database", In 2009 IEEE Conference on Computer Vision and Pattern Recognition, pp. 248-255, 2009, 8 pages.
4Dhariwal, et al., "Diffusion Models beat GANs on Image Synthesis", arXiv preprint arXiv:2105.05233v4 [cs.LG] Jun. 1, 2021, 44 pages.
5Goodfellow, et al., "Generative Adversarial Nets", arXiv preprint arXiv:1406.2661v1 [stat.ML] Jun. 10, 2014, 9 pages.
6Ha, et al., "HyperNetworks", arXiv preprint arXiv:1609.09106v4 [cs.LG] Dec. 1, 2016, 29 pages.
7Ho, et al., "Cascaded Diffusion Models for High Fidelity Image Generation", in Journal of Machine Learning Research 23, pp. 1-33, Jan. 2022, 33 pages.
8Ho, et al., "Classifier-Free Diffusion Guidance", arXiv preprint arXiv:2207.12598v1 [cs.LG] Jul. 26, 2022, 14 pages.
9Karras, et al., "A Style-Based Generator Architecture for Generative Adversarial Networks", arXiv preprint arXiv:1812.04948v3 [cs.NE] Mar. 29, 2019, 12 pages.
CN 111062865-A (Machine Translation on Mar. 6, 2025), (Apr. 2020).
Office Action dated Mar. 12, 2025 in related U.S. Patent Appln. U.S. Appl. No. 18/170,963.
Office Action dated Jul. 3, 2025 in related U.S. Appl. No. 18/170,963.
Lüddecke, et al., "Image segmentation using text and image prompts", Proceedings of the IEEE/CVF conference on computer vision and pattern recognition, 2022, pp. 7086-7096, (Year: 2022).
Ma, et al., "AI illustrator: Translating raw descriptions into images by prompt-based cross-modal generation", Proceedings of the 30th ACM International Conference on Multimedia, 2022, pp. 4282-4290, (Year: 2022).
Office Action dated Aug. 13, 2025 in relation U.S. Appl. No. 18/426,763.
Li, et al.; "MILi: Multi-person inference from a low-resolution image"; Mar. 2023; Fundamental Research; vol. 3, Issue 3; p. 434-441; https://doi.org/10.1016/j.fmre.2023.02.006. (Year: 2023).
Office Action dated Aug. 22, 2025 in relation U.S. Appl. No. 18/585,957.
Wang, et al., "Deep Multi-Task Learning for Diabetic Retinopathy Grading in Fundus Images", May 2021; Proceedings of the AAAI Conference on Artificial Intelligence; 35(4); p. 2826-2834; https://doi.org/10.1609/aaai.v35i4.16388. (Year: 2021).
Zbinden, Robin; "Implementing and Experimenting with Diffusion Models for Text-to-Image Generation"; Sep. 2022; EPFL; p. 21-22; https://arxiv.org/pdf/2209.10948. (Year: 2022).
Zhu, Peihao; "Improved StyleGAN Embedding: Where are the Good Latents?"; Oct. 2021; p. 1-2; https://arxiv.org/pdf/2012.09036 . (Year: 2021).
Office Action dated Sep. 16, 2025 in relation U.S. Appl. No. 18/439,036.
Office Action dated Jan. 13, 2026 in relation U.S. Appl. No. 18/439,036.
Notice of Allowance dated May 8, 2026 in related U.S. Appl. No. 18/439,036.
Office Action dated Apr. 2, 2026 in related U.S. Appl. No. 18/487,764.
Jain, et al., "Keys to Better Image Inpainting: Structure and Texture Go Hand in Hand", 2023 IEEE/CVF Winter Conference on Applications of Computer Vision (WACV), Waikoloa, HI, USA, 2023, pp. 208-217, doi:10.1109/WACV56688.2023.00029.

* cited by examiner

SUPER-RESOLUTION ON TEXT-TO-IMAGE SYNTHESIS WITH GANS

BACKGROUND

The following relates to digital image processing using machine learning. Digital image processing refers to the use of a computer to edit a digital image using an algorithm or a processing network. In some cases, image processing software can be used for various tasks, such as image editing, enhancement, restoration, image generation, etc. Some image generation systems implement machine learning techniques to generate a set of images based on a text prompt where the set of images vary in texture and details. In some examples, image generation (a subfield of image processing) includes the use of a style-based model to generate images based on an input condition (e.g., text prompt). Common style-based models include generative adversarial network (GAN), StyleGAN, StyleGAN2, CoModGAN. A StyleGAN model includes a mapping network and a synthesis network.

SUMMARY

The present disclosure describes systems and methods for image processing. Embodiments of the present disclosure include an image processing apparatus configured to perform text-to-image generation, in particular text-guided super-resolution using a generative adversarial network (GAN). An image generation network takes a low-resolution image (e.g., 64-pixel-by-64-pixel) and a text description of the low-resolution image, and outputs a high-resolution image (e.g., 512-pixel) including fine details. The image processing apparatus includes a mapping network and an image generation network comprising a synthesis network. For example, the image generation network is configured as an asymmetric U-Net architecture, where a 64-pixel low-resolution input goes through 3 downsampling layers (residual blocks), and then 6 upsampling layers (residual blocks) with attention layers to produce the 512-pixel image. Thus, the generated image is a high-resolution image that is generated at a high speed and provides more realistic results as desired by users.

A method, apparatus, and non-transitory computer readable medium for image processing are described. One or more embodiments of the method, apparatus, and non-transitory computer readable medium include obtaining a low-resolution image and a text description of the low-resolution image; generating a style vector representing the text description of the low-resolution image; generating an adaptive convolution filter based on the style vector; and generating a high-resolution image corresponding to the low-resolution image based on the adaptive convolution filter.

An apparatus and method for image processing are described. One or more embodiments of the apparatus and method include at least one processor; at least one memory storing instructions executable by the at least one processor; a mapping network comprising mapping parameters stored in the at least one memory, wherein the mapping network is configured to generate a style vector representing a low-resolution image; and an image generation network comprising image generation parameters stored in the at least one memory, wherein the image generation network comprises at least one downsampling layer and at least one upsampling layer, and wherein the image generation network is configured to generate a high-resolution image corresponding to a text description based on the style vector.

A method, apparatus, and non-transitory computer readable medium for image processing are described. One or more embodiments of the method, apparatus, and non-transitory computer readable medium include obtaining a training dataset including a high-resolution training image and a low-resolution training image; generating a predicted style vector representing the low-resolution training image using a mapping network; generating a predicted high-resolution image based on the low-resolution training image and the predicted style vector using an image generation network; generating an image embedding based on the predicted high-resolution image using a discriminator network; and training the image generation network based on the image embedding.

DETAILED DESCRIPTION

Figure 1:
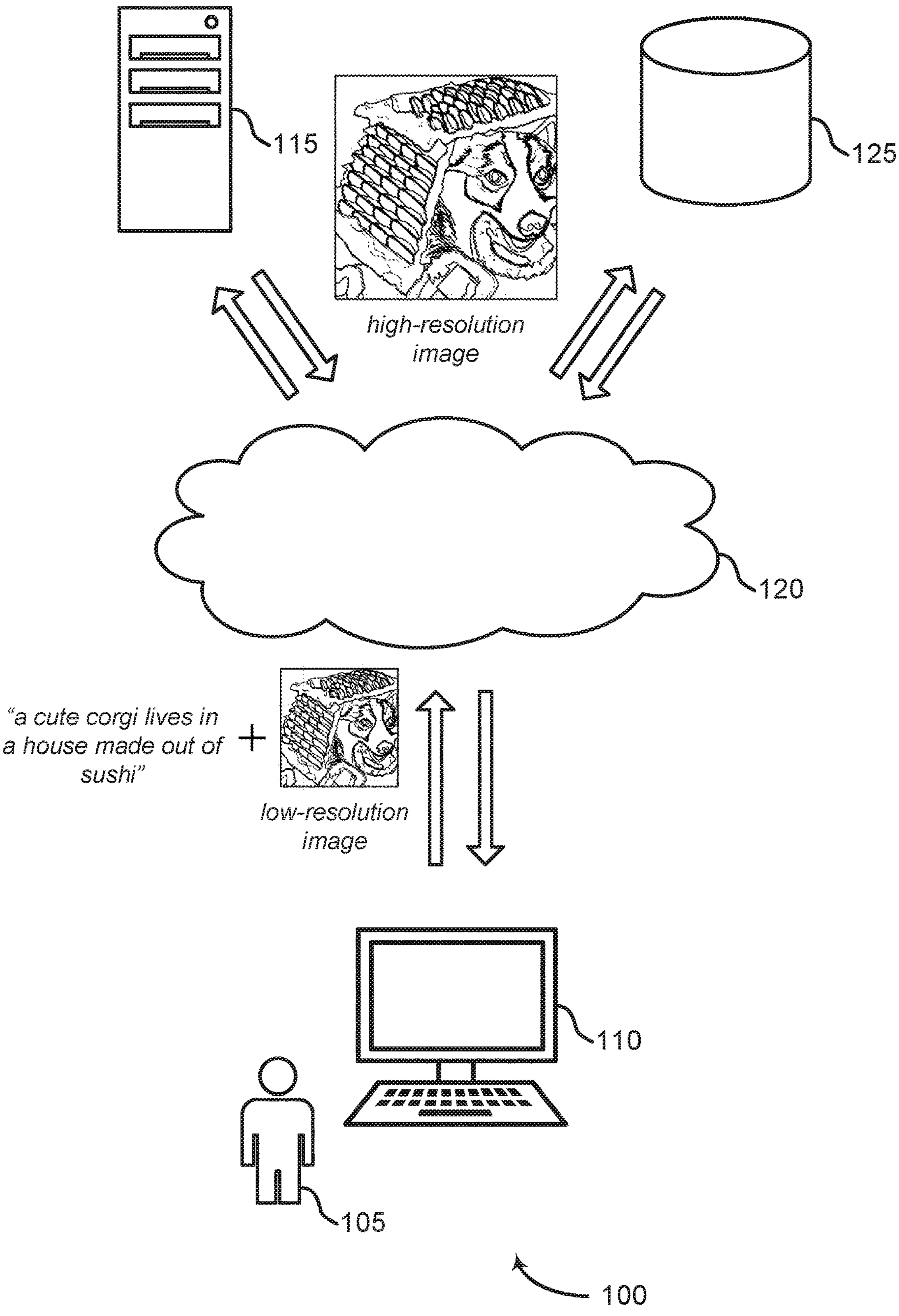
FIG. 1 shows an example of an image processing system according to aspects of the present disclosure.

The present disclosure describes systems and methods for image processing. Embodiments of the present disclosure include an image processing apparatus configured to perform text-to-image generation, in particular text-guided super-resolution using a generative adversarial network (GAN). An image generation network takes a low-resolution image (e.g., 64-pixel-by-64-pixel) and a text description of the low-resolution image, and outputs a high-resolution image (e.g., 512-pixel) including fine details. The image processing apparatus includes a mapping network and an image generation network comprising a synthesis network. For example, the image generation network is configured as an asymmetric U-Net architecture, where a 64-pixel low-resolution input goes through 3 downsampling layers (or residual blocks), and then 6 upsampling layers (residual blocks) with attention layers to produce the 512-pixel image. Thus, the generated image is a high-resolution image that is generated at a high speed and the generated image has more details and fine texture as desired by users.

Diffusion models are a class of generative neural networks that can be trained to generate new data with features similar to features found in training data. Diffusion models can be used in text-to-image generation, image completion, image super-resolution, etc. However, synthesized resolution using diffusion models is not high. Additionally, running time from diffusion models is often too long.

Generative adversarial networks (GANs) are a group of artificial neural networks where two neural networks are trained based on a contest with each other. Given a training set, the network learns to generate new data with similar properties as the training set. For example, a GAN trained on photographs can generate new images that look authentic to a human observer. GANs may be used in conjunction with supervised learning, semi-supervised learning, unsupervised learning, and reinforcement learning. In some embodiments, a GAN includes a generator network and a discriminator network.

Embodiments of the present disclosure include an image processing apparatus configured to obtain a low-resolution image and a text description of the low-resolution image and generate a high-resolution image. Specifically, the image processing apparatus includes a style-based machine learning model comprising a mapping network and an image generation network (also referred to as a synthesis network). The machine learning network is based on StyleGAN2 and is configured to include an asymmetric U-Net architecture. The image generation network includes at least one downsampling and at least one upsampling layer with attention layers to generate a 512-pixel high-resolution image that represents the low-resolution image and follows the text description.

According to some embodiments, the machine learning model generates style information based on input text, generates an adaptive convolution filter based on the style information and a bank of convolution filters, and generates an image based on the adaptive convolution filter. By pairing the attention layer with a convolution layer, and generating the image accordingly, the capacity of the machine learning model is further increased, thereby further increasing the processing speed of the image generation system. In some cases, the style information is generated based on a global vector that is computed based on the text input.

In some examples, the image generation network takes the style vector and a low-resolution image as input and applies a downsampling process followed by an upsampling process to generate a high-resolution image. The image generation network includes 3 downsampling layers and 7 upsampling layers/units (from 16×16 to 1024×1024). The number of downsampling and upsampling layers can vary (i.e., not limited to 3 downsampling layers and 7 upsampling layers). The first downsampling layer has a skip connection to the second upsampling layer (32×32). The second downsampling layer has a skip connection to the third upsampling layer (64×64).

With regards to training the machine learning model, a generator network generates candidates while a discriminator network evaluates them. The generator network learns to map from a latent space to a data distribution of interest, while the discriminator network distinguishes candidates produced by the generator from the true data distribution. The generator network's training objective is to increase the error rate of the discriminator network, i.e., to produce novel candidates that the discriminator network classifies as real.

Accordingly, aspects of the present disclosure provide an image generation system that generates a higher-quality image at a faster processing speed in response to a text prompt than conventional image generation systems are capable of. Furthermore, an adaptive convolution filter can be used to increase the convolutional capacity of an image generation system in a computationally efficient manner. In contrast, attempting to increase the convolutional capacity of a conventional image generation system by increasing the width of convolution layers would be computationally infeasible at scale, as the same operation would need to be repeated across all locations, resulting in significant computational overhead.

Additionally, by using a GAN-based machine learning model, generated high-resolution images are more accurately guided by the text description compared to conventional models. That is, image results from GAN-based model are more relevant and realistic. The image processing apparatus of the present disclosure reduces the processing time it takes to generate the high-resolution output (e.g., high speed at inference) compared to diffusion models. In some diffusion models, the initial output resolution of the text-to-image synthesis models are too small to be useful for many down-stream applications. These diffusion models, in order to generate images at higher resolution, have to train another model that performs super-resolution on the outputs. This leads to additional running time and CPU consumption.

Embodiments of the present disclosure can be used in the context of image generation applications. For example, an image processing network based on the present disclosure takes a low-resolution image and an associated text description as input and efficiently generates a high-resolution image that follows the text description. Example application or use cases, according to some embodiments, are provided with reference to FIGS. 2-4. Details regarding the architecture of an example image processing apparatus are provided with reference to FIGS. 1 and 5-10. Example processes for image generation are provided with reference to FIGS. 11-14. Example training processes are described with reference to FIGS. 15-16.

Image Generation System

In FIGS. 1-10 and 17, an apparatus and method for image processing are described. One or more embodiments of the apparatus include at least one processor; at least one memory storing instructions executable by the at least one processor; a mapping network comprising mapping parameters stored in the at least one memory, wherein the mapping network is configured to generate a style vector representing a low-resolution image; and an image generation network comprising image generation parameters stored in the at least one memory, wherein the image generation network comprises at least one downsampling layer and at least one upsampling layer, and wherein the image generation network is configured to generate a high-resolution image corresponding to a text description based on the style vector.

Some examples of the apparatus and method further include a text encoder network configured to encode the text description to obtain a global vector corresponding to the text description and a plurality of local vectors corresponding to individual tokens of the text description.

In some embodiments, the image generation network comprises a GAN. In some embodiments, the image generation network includes a convolution layer, a self-attention layer, and a cross-attention layer. In some embodiments, the image generation network includes a U-Net architecture. In some embodiments, the image generation network includes an adaptive convolution component configured to generate an adaptive convolution filter based on the style vector, wherein the high-resolution image is generated based on the adaptive convolution filter.

Some examples of the apparatus and method further include a discriminator network configured to generate an image embedding and a conditioning embedding, wherein the discriminator network is trained together with the image generation network using an adversarial training loss based on the image embedding and the conditioning embedding.

FIG. 1 shows an example of an image processing system 100 according to embodiments of the present disclosure. The example shown includes image processing system 100, user 105, user device 110, image processing apparatus 115, cloud 120, and database 125. Image processing apparatus 115 is an example of, or includes aspects of, the corresponding element described with reference to FIG. 5.

As an example shown in FIG. 1, user 100 provides a text description to image processing apparatus 115 via a user interface implemented on user device 110. The text description (or a text prompt) is a natural language statement describing an image. For example, the text description of the low-resolution image is "a cute corgi lives in a house made out of sushi". Image processing apparatus 115, via a mapping network and an image generation network, generates a high-resolution image based on the text description and the low-resolution image. That is, image processing apparatus 115 is configured for text-to-image super-resolution. Here, "super-resolution" may be referred to as a process of image upsampling. "Low resolution" and "high resolution" may refer to the number of pixels or level of detail present in an image. For example, threshold resolution values can be established to differentiate between low-resolution images and high-resolution images. In some examples, images with a resolution of 16×16 pixels can be referred to as low-resolution images, and images with a resolution of 1024×1024 pixels can be referred to as high-resolution images. In some cases, a low-resolution image (e.g., 16×16), via super-resolution or upsampling, is converted to a high-resolution image (e.g., 1024×1024) that includes greater details and fine textures. In some cases, a super-resolution process increases the resolution of an image while preserving or enhancing the details of the image. In some cases, the super-resolution generates a high-resolution image from one or more low-resolution images. In some cases, a super-resolution process may be referred to as upsampling. An up-sampled image may include a high-resolution image.

Image processing apparatus 115 generates the high-resolution image that accurately captures elements and relations among the elements in the text description. The generated high-resolution image is consistent with the low-resolution and the text description. In the example mentioned above, the high-resolution image includes a corgi with a house made of sushi that is consistent with the text description and the low-resolution image. The high-resolution image offers more relevant details, looks more realistic, and shows increased quality compared to the low-resolution image. Image processing apparatus 115 returns the output image to user 105 via cloud 120 and user device 110. The process of using image processing apparatus 115 is further described with reference to FIG. 11.

User device 110 may be a personal computer, laptop computer, mainframe computer, palmtop computer, personal assistant, mobile device, or any other suitable processing apparatus. In some examples, the user device 110 includes software that incorporates an image processing application (e.g., an image editing application). The image editing application may either include or communicate with image processing apparatus 115. In some examples, the image editing application on user device 110 may include functions of image processing apparatus 115.

A user interface may enable user 105 to interact with user device 110. In some embodiments, the user interface may include an audio device, such as an external speaker system, an external display device such as a display screen, or an input device (e.g., a remote control device interfaced with the user interface directly or through an I/O controller module). In some cases, a user interface may be a graphical user interface (GUI). In some examples, a user interface may be represented in code which is sent to the user device and rendered locally by a browser.

Image processing apparatus 115 includes a computer implemented network. Image processing apparatus 115 may also include a processor unit, a memory unit, an I/O module, and a training component. The training component is used to train a machine learning model (e.g., a diffusion model). Additionally, image processing apparatus 115 can communicate with database 125 via cloud 120. In some cases, the architecture of the image processing network is also referred to as a network or a network model. Further detail regarding the architecture of image processing apparatus 115 is provided with reference to FIGS. 6-10. Further detail regarding the operation of image processing apparatus 115 is provided with reference to FIGS. 11-14.

In some cases, image processing apparatus 115 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

Cloud 120 is a computer network configured to provide on-demand availability of computer system resources, such as data storage and computing power. In some examples, cloud 120 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 120 is limited to a single organization. In other examples, cloud 120 is available to many organizations. In one example, cloud 120 includes a multi-layer communications network comprising multiple edge routers and core routers. In another example, cloud 120 is based on a local collection of switches in a single physical location.

Database 125 is an organized collection of data. For example, database 125 stores data in a specified format known as a schema. Database 125 may be structured as a single database, a distributed database, multiple distributed databases, or an emergency backup database. In some cases, a database controller may manage data storage and processing in database 125. In some cases, a user interacts with database controller. In other cases, database controller may operate automatically without user interaction.

Figure 2:
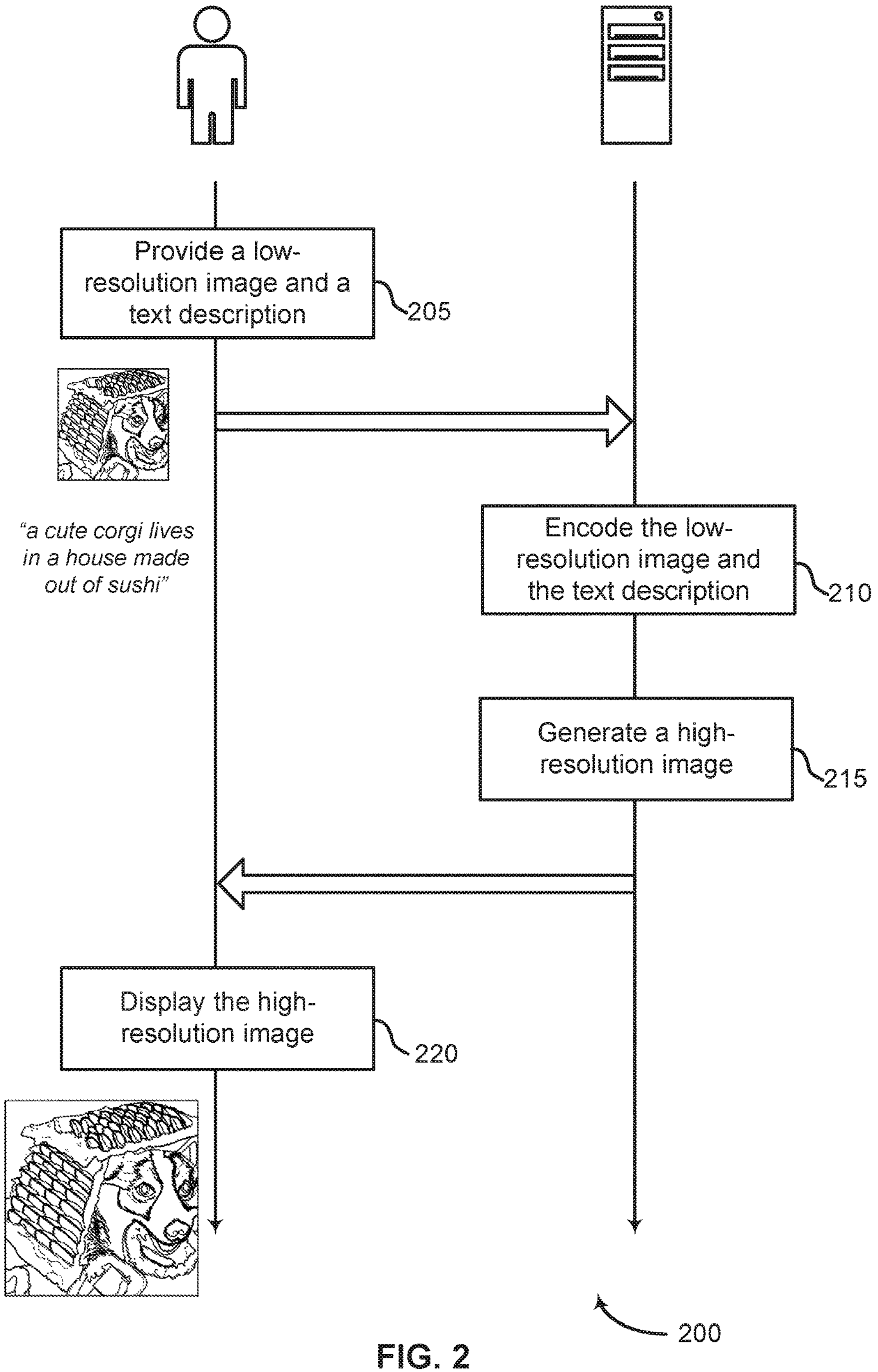
FIG. 2 shows an example of an image upsampling application according to aspects of the present disclosure.

FIG. 2 shows an example of an image upsampling application 200 according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 205, the user provides a low-resolution image and a text description. In some cases, the operations of this step refer to, or may be performed by, a user as described with reference to FIG. 1. As an example shown in FIG. 2, the text description includes a text prompt that describes the low-resolution image. The text description and the low-resolution image are uploaded to the image processing apparatus via a user interface.

At operation 210, the system encodes the low-resolution image and the text description. In some cases, the operations of this step refer to, or may be performed by, an image processing apparatus as described with reference to FIGS. 1 and 5. A text encoder network of the image processing apparatus converts the text description to a text embedding. A mapping network of the image processing apparatus generates a style vector based on the text description. Further details regarding the operation of the text encoder network and mapping network are provided with reference to FIG. 12.

At operation 215, the system generates a high-resolution image corresponding to the low-resolution image. In some cases, the operations of this step refer to, or may be performed by, an image processing apparatus as described with reference to FIGS. 1 and 5. An image generation network of the image processing apparatus takes the style vector from the mapping network and the low-resolution image as input and generates the high-resolution image. In some examples, the image generation network is a GAN-based model.

At operation 220, the system displays the high-resolution image to the user. In some cases, the operations of this step refer to, or may be performed by, an image processing apparatus as described with reference to FIGS. 1 and 5. In some cases, the image processing apparatus displays the high-resolution image to the user via the user interface. The high-resolution image accurately follows the text description. That is, the high-resolution image closely depicts elements and relations among the elements in the text prompt.

Figure 3:
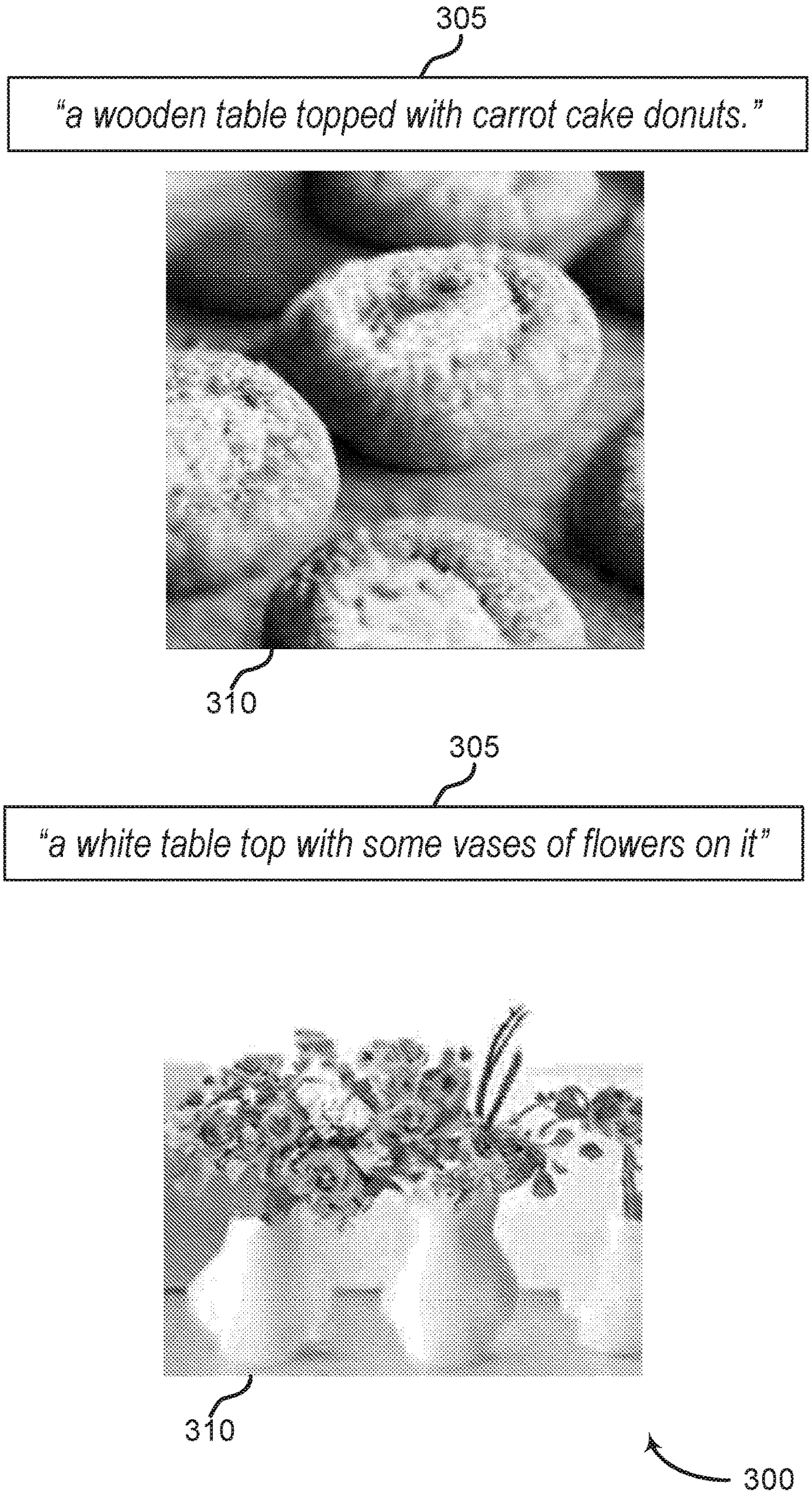
FIG. 3 shows examples of text-to-image generated results according to aspects of the present disclosure.

FIG. 3 shows an example of text-to-image generated results according to embodiments of the present disclosure. The example shown includes generated images 300, text description 305, and output image 310. Text description 305 is an example of, or includes aspects of, the corresponding element described with reference to FIGS. 9-10 and 12.

According to an embodiment of the present disclosure, text description 305 is used to generate or predict output image 310. Output image 310 (produced by an image processing apparatus) accurately follows elements and relations among the elements in text description 305. As an example, a text description is "a wooden table topped with carrot cake donuts". The text description is input to the image processing apparatus via a user interface as described with reference to FIGS. 1-2. The image processing apparatus generates an output image that follows the text description. The process may also be referred to as text-to-image synthesis or text-to-image generation.

In another example, a text description is "a white table top with some vases of flowers on it", which is input to the image processing apparatus. The image processing apparatus generates an output image based on the text description. In some examples, the image processing apparatus generates high-resolution images from text prompts at an interactive speed of 0.14 s.

Figure 4:
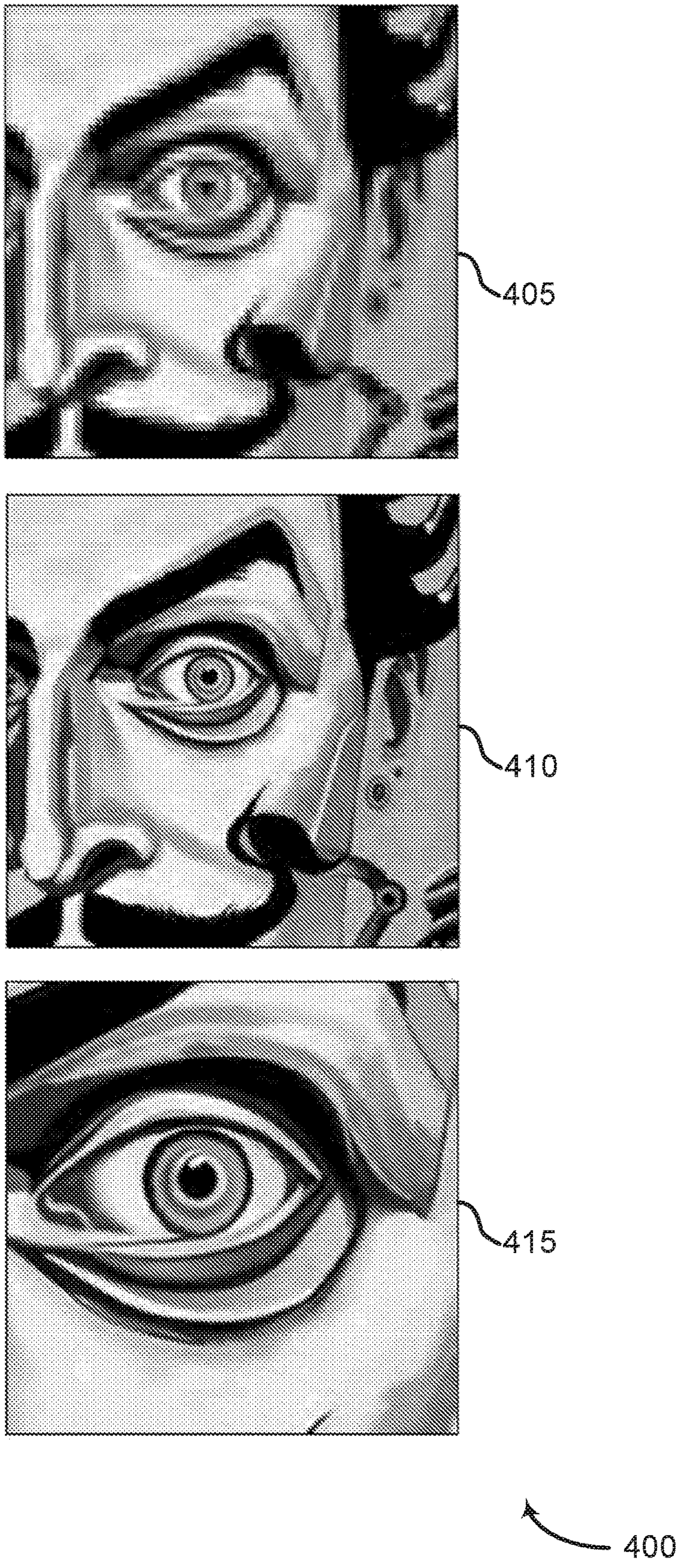
FIG. 4 shows examples of super-resolution images according to aspects of the present disclosure.

FIG. 4 shows an example of super-resolution images according to embodiments of the present disclosure. The example shown includes low-resolution image 405, high-resolution image 410, and zoomed-in image 415. Low-resolution image 400 is an example of, or includes aspects of, the corresponding element described with reference to FIGS. 9 and 10. High-resolution image 410 is an example of, or includes aspects of, the corresponding element described with reference to FIGS. 9 and 10. Zoomed-in image 415 refers to a zoomed-in or magnified section of high-resolution image 410. As an example shown in FIG. 4, high-resolution image 410 and zoomed-in image 415 have fine details and sharp textures compared to low-resolution image 405, such as the iris in artistic style. High-resolution image 410 includes or presents more information compared to low-resolution image 405.

As an example shown in FIG. 4, the image processing apparatus is trained to take low-resolution image 405 and a text description as input and generate high-resolution image 410. For example, the image processing apparatus includes one or more low-resolution image generators and upsamplers that each uses a GAN-based approach to synthesize high-resolution image 410. The image processing apparatus learns a high-capacity 64-pixel base model and then trains a 64-pixel to 512-pixel GAN-based upsampler. In some examples, the image generation network uses a cascaded generation process where images are first generated at 64×64 resolution and upsampled to 256×256 and 1024×1024 sequentially.

Figure 5:
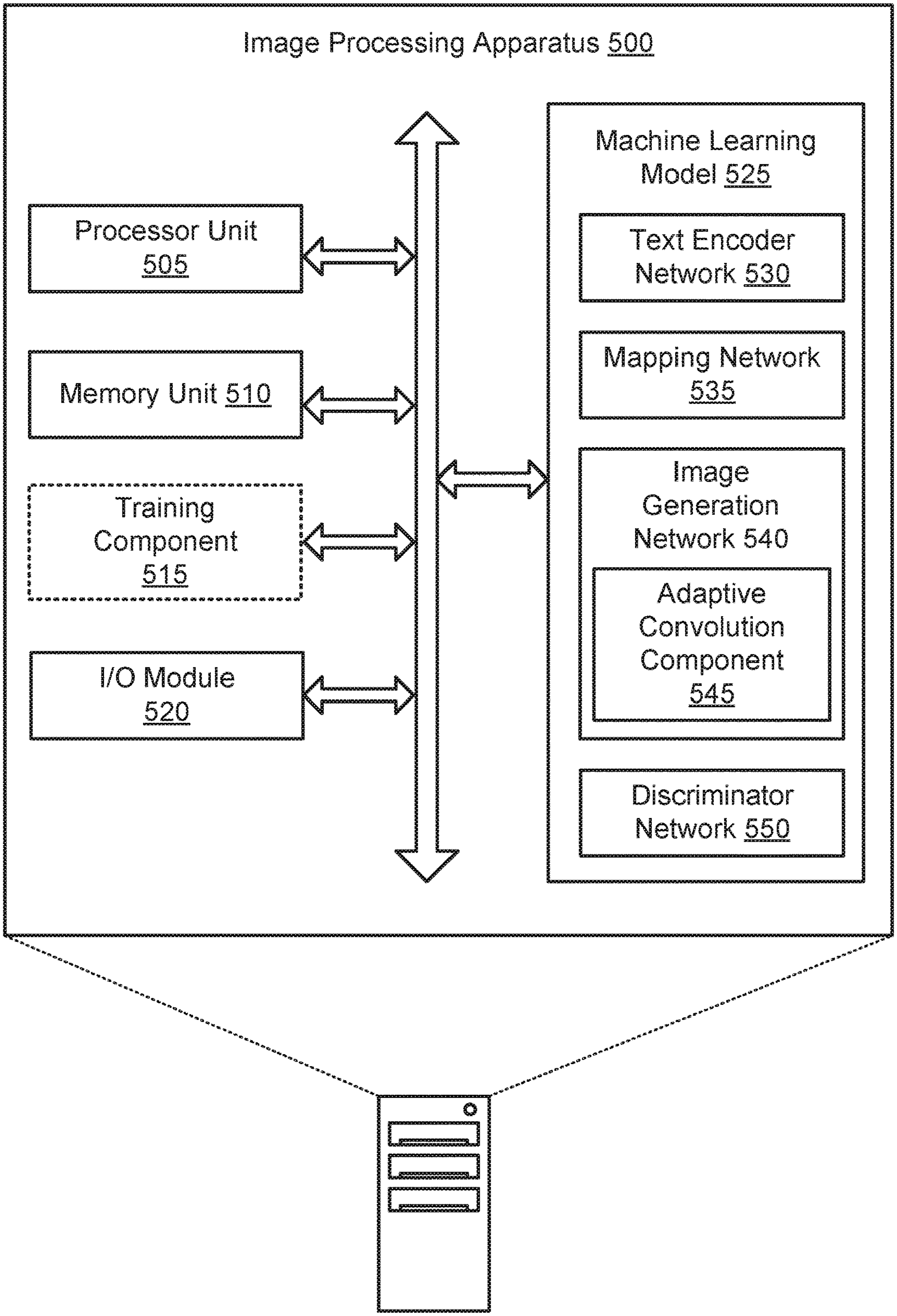
FIG. 5 shows an example of an image processing apparatus according to aspects of the present disclosure.

FIG. 5 shows an example of an image processing apparatus 500 according to embodiments of the present disclosure. The example shown includes image processing apparatus 500, processor unit 505, memory unit 510, training component 515, I/O module 520, and machine learning model 525. Image processing apparatus 500 is an example of, or includes aspects of, the corresponding element described with reference to FIG. 1.

Processor unit 505 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 505 is configured to operate a memory array using a memory controller. In other cases, a memory controller is integrated into processor unit 505. In some cases, processor unit 505 is configured to execute computer-readable instructions stored in a memory to perform various functions. In some embodiments, processor unit 505 includes special purpose components for modem processing, baseband processing, digital signal processing, or transmission processing. According to some embodiments, processor unit 505 is configured to perform operations of machine learning model 525.

Memory unit 510 includes instructions executable by processor unit 505. Examples of memory unit 510 include random access memory (RAM), read-only memory (ROM), or a hard disk. Examples of memory unit 510 include solid state memory and a hard disk drive. In some examples, memory unit 510 is used to store computer-readable, computer-executable software including instructions that, when executed, cause a processor to perform various functions described herein. In some cases, memory unit 510 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state. Memory unit 510 includes parameters of machine learning model 525.

According to some embodiments of the present disclosure, image processing apparatus 500 includes a computer implemented artificial neural network (ANN) for image generation. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge are associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the neural network. Hidden representations are machine-readable data representations of an input that are learned from a neural network's hidden layers and are produced by the output layer. As the neural network's understanding of the input improves as it is trained, the hidden representation is progressively differentiated from earlier iterations.

During a training process of an ANN, the node weights are adjusted to improve the accuracy of the result (i.e., by minimizing a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some embodiments, image processing apparatus 500 includes a convolutional neural network (CNN) for image generation. CNN is a class of neural networks that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some embodiments, training component 515 obtains a training dataset including a high-resolution training image and a low-resolution training image. Training component 515 trains image generation network 540 based on an image embedding. In some examples, training component 515 computes a generative adversarial network (GAN) loss based on the image embedding, where the image generation network 540 is trained based on the GAN loss. In some examples, training component 515 computes a perceptual loss based on the low-resolution training image and the predicted high-resolution image, where the image generation network 540 is trained based on the perceptual loss. In some examples, training component 515 adds noise to the low-resolution training image using forward diffusion to obtain an augmented low-resolution training image, where the predicted high-resolution image is generated based on the augmented low-resolution training image. Training component 515 is an example of, or includes aspects of, the corresponding element described with reference to FIG. 16.

In some cases, training component 515 is implemented on a separate apparatus other than image processing apparatus 500 to perform the functions described herein. Image processing apparatus 500 communicates with the separate apparatus to perform the training processes described herein.

I/O module 520 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an I/O controller.

In some examples, I/O module 520 includes a user interface. A user interface may enable a user to interact with a device. In some embodiments, the user interface may include an audio device, such as an external speaker system, an external display device such as a display screen, or an input device (e.g., a remote control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

Machine learning model 525 is used to make predictions based on input data in an image generation application. Developing a machine learning model is an iterative process of writing, editing, re-writing, and testing configurations, algorithms, and model parameters. The process includes the stages of acquiring and exploring data, identifying features of the data, creating a model, evaluating the model, making predictions, and developing insights based on the model. The model can then be implemented on a large-scale platform enabling other users to deploy functionalities and capabilities from large datasets across different use cases.

According to some embodiments of the present disclosure, machine learning model 525 obtains a low-resolution image and a text description of the low-resolution image. Machine learning model 525 is an example of, or includes aspects of, the corresponding element described with reference to FIGS. 7, 9, and 10. In one embodiment, machine learning model 525 includes text encoder network 530, mapping network 535, image generation network 540, and discriminator network 550.

According to some embodiments, text encoder network 530 encodes the text description of the low-resolution image to obtain a text embedding. Text encoder network 530 transforms the text embedding to obtain a global vector corresponding to the text description as a whole and a set of local vectors corresponding to individual tokens of the text description, where the style vector is generated based on the global vector and the high-resolution image is generated based on the set of local vectors. According to some embodiments, text encoder network 530 encodes text describing the low-resolution training image to obtain a text embedding. Text encoder network 530 is an example of, or includes aspects of, the corresponding element described with reference to FIGS. 7, 9, and 10.

According to some embodiments, text encoder network 530 includes a pretrained encoder and a learned encoder. In some cases, the pretrained encoder is implemented as a Contrastive Language-Image Pre-training (CLIP) model. CLIP is a neural network that is trained to efficiently learn visual concepts from natural language supervision. CLIP can be instructed in natural language to perform a variety of classification benchmarks without directly optimizing for the benchmarks' performance, in a manner building on "zero-shot" or zero-data learning. CLIP can learn from unfiltered, highly varied, and highly noisy data, such as text paired with images found across the Internet, in a similar but more efficient manner to zero-shot learning, thus reducing the need for expensive and large labeled datasets. The CLIP model can be used for a wide range of visual classification tasks, enabling the prediction of the likelihood of a text description being associated with a specific image. For example, when applied to nearly arbitrary visual classification tasks, a CLIP model may predict the likelihood of a text description being paired with a particular image, without the need for users to design classifiers and the need for task-specific training data. For example, a CLIP model can be applied to a new task by providing names of the task's visual concepts as input to the model's text encoder. The model can then output a linear classifier of CLIP's visual representations.

According to some embodiments, mapping network 535 generates a style vector representing the text description of the low-resolution image. In some examples, mapping network 535 obtains a noise vector, where the style vector is based on the noise vector. According to some embodiments, mapping network 535 comprises mapping parameters stored in the at least one memory, wherein the mapping network is configured to generate a style vector representing a low-resolution image. According to some embodiments, mapping network 535 generates a predicted style vector representing the low-resolution training image. Mapping network 535 is an example of, or includes aspects of, the corresponding element described with reference to FIGS. 6, 7, 9, 10, and 16.

In some cases, mapping network 535 includes a multi-layer perceptron (MLP). An MLP is a feed forward neural network that typically consists of multiple layers of perceptrons. Each component perceptron layer may include an input layer, one or more hidden layers, and an output layer. Each node may include a nonlinear activation function. An MLP may be trained using backpropagation (i.e., computing the gradient of the loss function with respect to the parameters).

According to some embodiments, image generation network 540 generates a high-resolution image corresponding to the low-resolution image based on the adaptive convolution filter. In some examples, image generation network 540 performs a cross-attention process based on the set of local vectors, where the high-resolution image is generated based on the cross-attention process. In some examples, image generation network 540 generates a feature map based on the low-resolution image. Image generation network 540 performs a convolution process on the feature map based on adaptive convolution filter 545, where the high-resolution image is generated based on the convolution process. In some examples, image generation network 540 performs a self-attention process based on the feature map, where the high-resolution image is generated based on the self-attention process.

According to some embodiments, image generation network 540 comprises image generation parameters stored in the at least one memory, wherein the image generation network comprises at least one downsampling layer and at least one upsampling layer, and wherein the image generation network is configured to generate a high-resolution image corresponding to a text description based on the style vector. In some embodiments, the image generation network 540 includes a GAN. In some embodiments, image generation network 540 includes a convolution layer, a self-attention layer, and a cross-attention layer. In some embodiments, image generation network 540 includes a U-Net architecture.

GAN is an artificial neural network in which two neural networks (e.g., a generator and a discriminator) are trained based on a contest with each other. For example, the generator learns to generate a candidate by mapping information from a latent space to a data distribution of interest, while the discriminator distinguishes the candidate produced by the generator from a true data distribution of the data distribution of interest. The generator's training objective is to increase an error rate of the discriminator by producing novel candidates that the discriminator classifies as "real" (e.g., belonging to the true data distribution).

Therefore, given a training set, the GAN learns to generate new data with similar properties as the training set. For example, a GAN trained on photographs can generate new images that look authentic to a human observer. GANs may be used in conjunction with supervised learning, semi-supervised learning, unsupervised learning, and reinforcement learning.

For example, StyleGAN is an extension to the GAN architecture that uses an alternative generator network.

StyleGAN includes using a mapping network to map points in latent space to an intermediate latent space, using an intermediate latent space to control style at each point, and introducing noise as a source of variation at each point in the generator network. In some examples, the image generation network is a GAN model that includes a mapping network and a synthesis network. In some cases, the synthesis network of the image generation network includes an encoder and a decoder with a skip connection in a U-net architecture. For example, a layer of the decoder is connected to a layer of the encoder by a skip connection in a U-net architecture.

According to some embodiments, image generation network 540 includes adaptive convolution component 545 configured to generate an adaptive convolution filter based on the style vector, where the high-resolution image is generated based on the adaptive convolution filter. According to some embodiments, image generation network 540 generates a predicted high-resolution image based on the low-resolution training image and the style vector. Image generation network 540 is an example of, or includes aspects of, the corresponding element described with reference to FIGS. 7, 9, 10, and 16.

According to some embodiments, adaptive convolution component 545 generates an adaptive convolution filter based on the style vector. In some examples, an adaptive convolution filter is a filter that can automatically adjust the filter's parameters based on the input data, in contrast to fixed convolution filters, which have a predetermined set of parameters that are applied uniformly to all input data. In some examples, adaptive convolution component 545 identifies a set of predetermined convolution filters. Adaptive convolution component 545 combines the set of predetermined convolution filters based on the style vector to obtain the adaptive convolution filter. In some cases, a convolution filter (or convolution kernel, or kernel) refers to a convolution matrix or mask that performs a convolution on an image to blur, sharpen, emboss, detect edges, and perform other functions on pixels of the image. In some cases, the convolution filter represents a function of each pixel in an output image to nearby pixels in an input image.

According to some embodiments, discriminator network 550 encodes the low-resolution image to obtain an image embedding, where the style vector is generated based on the image embedding. According to some embodiments, discriminator network 550 is configured to generate an image embedding and a conditioning embedding, wherein the discriminator network 550 is trained together with image generation network 540 using an adversarial training loss based on the image embedding and the conditioning embedding.

According to some embodiments, discriminator network 550 generates an image embedding based on the predicted high-resolution image. In some examples, discriminator network 550 generates a conditioning embedding based on the text embedding, where image generation network 540 is trained based on the conditioning embedding. Discriminator network 550 is an example of, or includes aspects of, the corresponding element described with reference to FIG. 16.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

Figure 6:
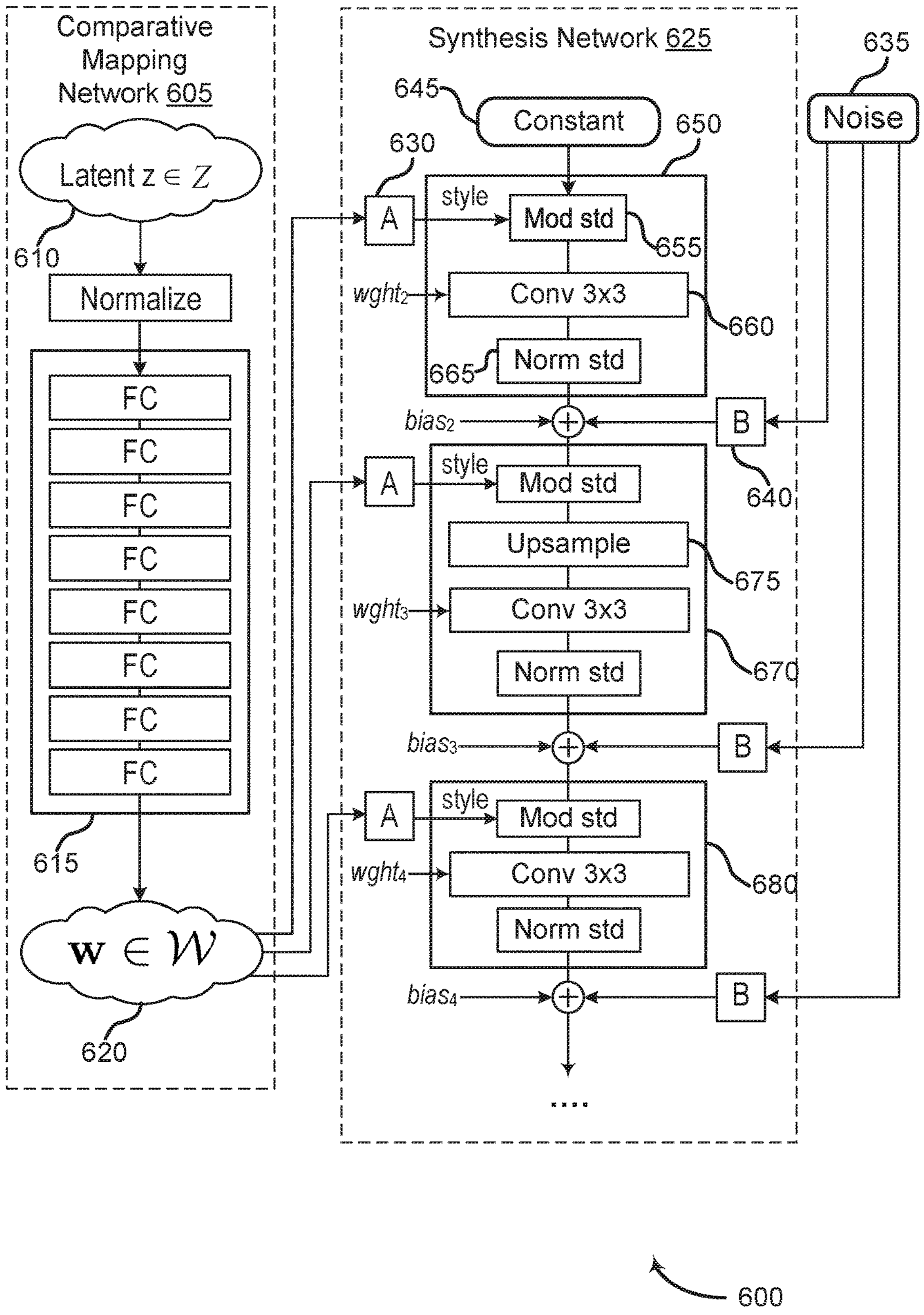
FIG. 6 shows an example of a StyleGAN based model according to aspects of the present disclosure.

FIG. 6 shows an example of a StyleGAN based model according to embodiments of the present disclosure. The example shown includes image generation model 600, mapping network 605, latent vector 610, fully connected layer 615, intermediate latent space 620, synthesis network 625, learned affine transform 630, noise input 635, learned per-layer scaling factors 640, constant input 645, first convolutional layer 650, modulation 655, convolution 660, normalization 665, second convolutional layer 670, upsampling 675, and third convolutional layer 680. Mapping network 605 is an example of, or includes aspects of, the corresponding element described with reference to FIGS. 5, 7, 9, 10, and 16.

Generative adversarial networks (GANs) are a group of artificial neural networks where two neural networks are trained based on a contest with each other. Given a training set, the network learns to generate new data with similar properties as the training set. For example, a GAN trained on photographs can generate new images that look authentic to a human observer. GANs may be used in conjunction with supervised learning, semi-supervised learning, unsupervised learning, and reinforcement learning. In some embodiments, a GAN includes a generator network and a discriminator network. The generator network generates candidates while the discriminator network evaluates them. The generator network learns to map from a latent space to a data distribution of interest, while the discriminator network distinguishes candidates produced by the generator from the true data distribution. The generator network's training objective is to increase the error rate of the discriminator network, i.e., to produce novel candidates that the discriminator network classifies as real.

FIG. 6 shows an example of a style-based generative adversarial network (StyleGAN). In this example, image generation model 600 is a StyleGAN2 model. StyleGAN or StyleGAN2 is an extension to the GAN architecture that uses an alternative generator network. StyleGAN includes using a mapping network 605 to map points in input latent space (e.g., latent vector 610 or vector z) to an intermediate latent space 620, using the intermediate latent space 620 to control style at each point, and introducing noise as a source of variation at each point in the generator network.

The mapping network 605 performs a reduced encoding of the original input and the synthesis network 625 generates, from the reduced encoding, a representation as close as possible to the original input. According to some embodiments, the mapping network 605 includes a deep learning neural network comprised of fully connected layers (e.g., fully connected layer 615). In some cases, the mapping network 605 takes a randomly sampled point from the input latent space, such as latent vector z, as input and generates a style vector w as output.

According to some embodiments, the synthesis network 625 includes a first convolutional layer 650, a second convolutional layer 670, and a third convolutional layer 680. For example, the first convolutional layer 650 includes modulation 655, convolution 660 such as a conv 3×3, and normalization 665. A constant input 645, such as a 4×4×512 constant value, is input to the first convolutional layer 650. The output from first convolutional layer 650 is input to the second convolutional layer 670. The second convolutional layer 670 includes modulation, an upsampling layer (e.g., upsampling 675), convolution such as conv 3×3, and normalization.

According to an embodiment, the synthesis network 625 takes a constant input 645, for example, a constant 4×4×512 constant value, as input to start the image synthesis process. The style vector (e.g., vector w) generated from the mapping network 605 is transformed by learned affine transform 630 (i.e., denoted as block A) and is incorporated into each block of the synthesis network 625 before the convolutional layers (e.g., conv 3×3). In some cases, each block of the synthesis network 625 is referred to as a style block.

In some examples, with regards to original StyleGAN, the style vector (e.g., vector w) generated from the mapping network 605 is transformed by learned affine transform 630 (i.e., block A) and is incorporated into each block of the synthesis network 625 after the convolutional layers (e.g., conv 3×3) via the AdaIN operation, such as adaptive instance normalization. For example, an affine transform is a linear transformation that preserves parallel lines and ratios of distances in images. For example, an affine transform can be used to perform operations on an image, such as rotation, scaling, translation, and shearing. For example, by applying an affine transform to an image, the position, orientation, and scale of the image may be changed, whereas the overall shape and structure of the image are preserved. The original StyleGAN applies bias and noise within the style block, causing their relative impact to be inversely proportional to the current style's magnitudes. In some cases, the adaptive instance normalization layers can perform the adaptive instance normalization. The AdaIN layers perform a normalization process on the output of the feature map, which transforms the latent space to better align with the desired distribution of image features. For example, the output of the feature map is standardized to follow a Gaussian distribution, allowing a randomly selected feature map to represent a range of diverse features. The style vector is then added to this normalized feature map as a bias term, allowing the model to incorporate the desired style into the output image. This allows choosing a random latent variable so that the resulting output will not bunch up. In some cases, the output of each convolutional layer (e.g., conv 3×3) in the synthesis network 625 is a block of activation maps. In some cases, the upsampling layer doubles the dimensions of input (e.g., from 4×4 to 8×8) and is followed by another convolutional layer(s) (e.g., third convolutional layer).

Referring to FIG. 6, an example of StyleGAN2, more predictable results are obtained by moving these operations outside the style block, where they operate on normalized data. The synthesis network 625 enables normalization 665 and modulation 655 to operate on the standard deviation alone (i.e., the mean is not needed). The application of bias, noise, and normalization to the constant input 645 can also be removed.

According to an embodiment, block A denotes a learned affine transform 630 from W that produces a style, and block B is a noise broadcast operation. "Wght" or lower-case w is a learned weight. Lower-case b is a bias. The activation function (e.g., leaky ReLU) is applied right after adding the bias. The addition of bias b and B are outside active area of a style, and only the standard deviation is adjusted per feature map. In some cases, instance normalization is replaced with a "demodulation" operation, which is applied to the weights associated with each convolution layer.

In a style block (e.g., first convolutional layer 650), modulation 655 is followed by a convolution 660, and followed by normalization 665. The modulation 655 scales each input feature map of the convolution based on the incoming style, which can alternatively be implemented by scaling the convolution weights.

According to some embodiments, Gaussian noise is added to each of these activation maps. A different noise sample is generated for each block and is interpreted using learned per-layer scaling factors 640. In some embodiments, the Gaussian noise introduces style-level variation at a given level of detail.

Figure 7:
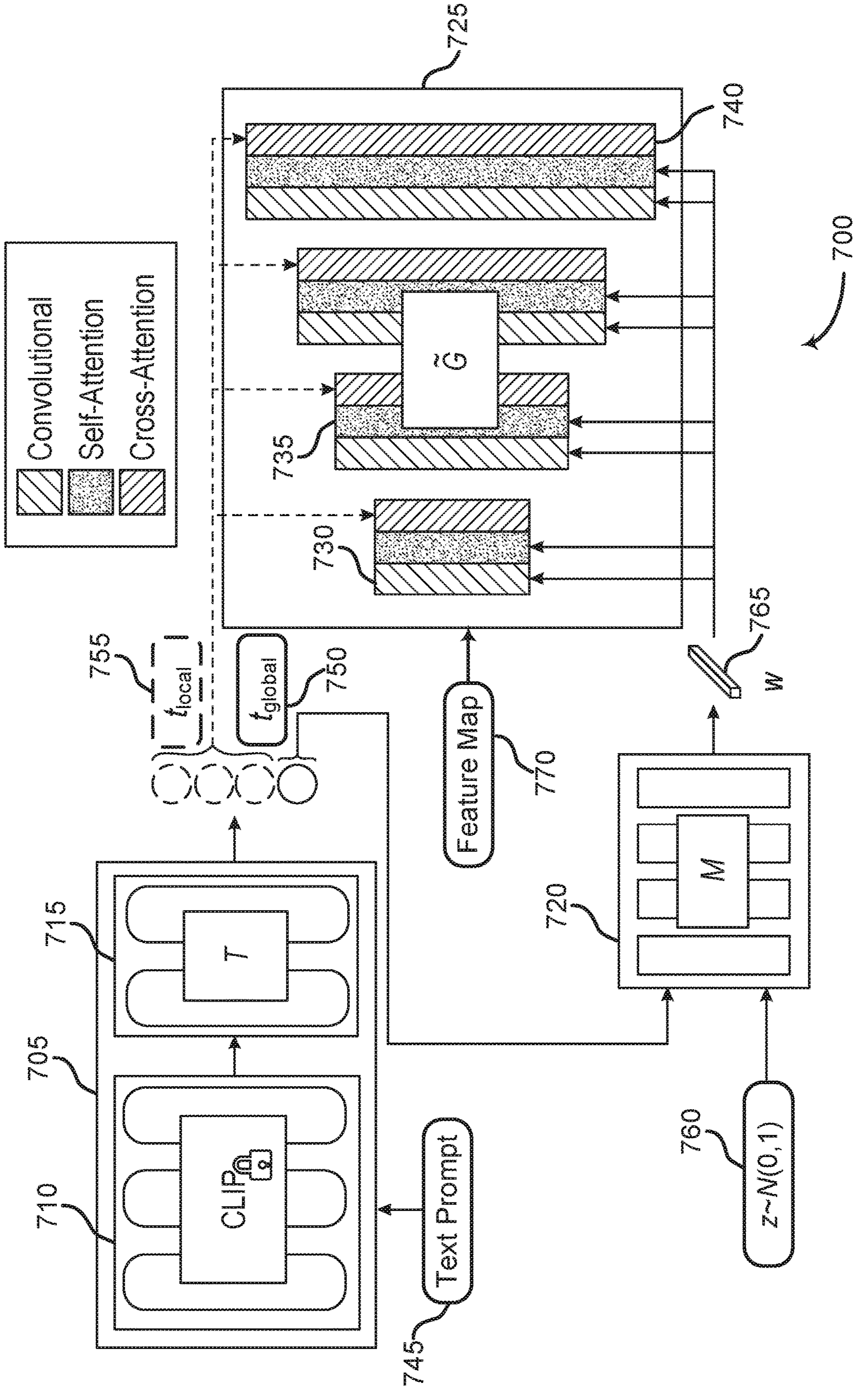
FIG. 7 shows an example of a machine learning model according to aspects of the present disclosure.

FIG. 7 shows an example of a machine learning model 700 according to embodiments of the present disclosure. The example shown includes machine learning model 700, text prompt 745, global vector 750, local vectors 755, noise vector 760, style vector 765, and feature map 770. In some cases, machine learning model 700 comprises text encoder network 705, mapping network 720, and image generation network 725. According to an embodiment, text encoder network 705 includes pretrained encoder 710 and learned encoder 715. Machine learning model 700 is an example of, or includes aspects of, the corresponding element described with reference to FIGS. 5, 9, and 10.

In an embodiment, text encoder network 705 generates text embeddings from a text prompt. For example, text prompt 745 refers to the text description provided by a user, as described with reference to FIGS. 1-2 and 4. Pretrained encoder 710 of text encoder network 705 extracts text embeddings from text prompt 745. In some examples, pretrained encoder 710 is a pretrained CLIP model, followed by a learned encoder 715. Text prompt 745 is an example of, or includes aspects of, the corresponding element described with reference to FIGS. 9, 10, and 16.

Text encoder network 705 is an example of, or includes aspects of, the corresponding element described with reference to FIGS. 5, 9, and 10. Pretrained encoder 710 is an example of, or includes aspects of, the corresponding element described with reference to FIG. 9.

Further, learned encoder 715 of text encoder network 705 takes the text embedding provided by the pretrained encoder and generates global vector 750 and local vectors 755. Herein, global vector 750 is represented as solid circle. Local vectors 755 are represented as dashed circles. Three local vectors (three dashed circles) and one global vector are included in FIG. 7 for illustration purpose, and embodiments of the present disclosure are not limited thereto. In some cases, text encoder network 705 generates less than or more than three local vectors depending on the length of text prompt 745. Learned encoder 715 is an example of, or includes aspects of, the corresponding element described with reference to FIG. 9. Global vector 750 is an example of, or includes aspects of, the corresponding element described with reference to FIGS. 9 and 10.

Global vector 750 is input to mapping network 720. Noise vector 760 is also input to mapping network 720. Mapping network 720 takes global vector and noise vector as input to generate style vector 765. Style vector 765 modulates image generation network 725 using style-adaptive kernel selection. Further details regarding the style-adaptive kernel selection are provided with reference to FIG. 8.

Mapping network 720 is an example of, or includes aspects of, the corresponding element described with reference to FIGS. 5, 6, 9, 10, and 16. Style vector 765 is an example of, or includes aspects of, the corresponding element described with reference to FIGS. 9 and 10. Noise vector 760 is an example of, or includes aspects of, the corresponding element described with reference to FIGS. 9 and 10.

According to an embodiment, noise vector 760 refers to a Gaussian noise that is added to each of the activation maps in mapping network 720. Noise vector 760 is represented as standard Normal distribution, $z \sim N(0, 1)$. In some cases, noise vector 760 is a latent code in a normal distribution of a latent space. The Gaussian noise introduces variation of style vector 765 at a desired level.

Local vectors 755 and style vector 765 are input to image generation network 725. In some examples, local vectors 755 are input (or added) to each cross-attention layer and style vector 765 is input to (or added) to each convolution layer 730 and each self-attention layer 735. In some cases, image generation network G (725) takes learned feature map f (770) and maps the feature map to an output image x conditioned on the style vector w. Image generation network 725 is an example of, or includes aspects of, the corresponding element described with reference to FIGS. 5, 9, 10, and 16. Local vectors 755 are an example of, or includes aspects of, the corresponding element described with reference to FIGS. 9 and 10.

For example, image generation network 725 adjusts the “style” of the image at each convolution layer based on a latent code, therefore controlling the strength of image features at different scales. Combined with noise injected into the network, mapping network 720 provides automatic, unsupervised separation of high-level attributes (e.g., pose, identity) from stochastic variation (e.g., freckles, hair) in the generated images, and enables intuitive scale-specific mixing and interpolation operations. Image generation network 725 embeds the input latent code into an intermediate latent space, which influences the representation of factors of variation in the network.

In some cases, for style mixing to work, image generation network 725 counteracts amplification of feature maps on a per-sample basis. As a result, the subsequent layers of image generation network 725 operate on the data in a meaningful manner. According to an embodiment, normalization is performed on the expected statistics of the feature maps.

Referring to FIG. 7, image generation network 725 includes convolutional layer 730, self-attention layer 735, and cross-attention layer 740. Image generation network 725 includes a series of upsampling convolutional layers that are modulated by style vector 765. In some examples, the convolution process generates output pixels with the style vector to model conditioning. Self-attention layer 735 is an example of, or includes aspects of, the corresponding element described with reference to FIG. 9. Cross-attention layer 740 is an example of, or includes aspects of, the corresponding element described with reference to FIG. 9.

Image generation network 725 includes a self-attention block comprising one or more self-attention layers 735, a cross-attention block comprising one or more cross-attention layers 740, or a combination thereof. The combination of self-attention layer 735 and cross-attention layer 740 in each processing block/unit increases capacity of image generation network 725. In some cases, one processing block/unit includes a convolutional layer 730, a self-attention layer 735, and a cross-attention layer 740. That is, one processing block/unit is represented as a three-strip block. Multiple such processing blocks are implemented in sequence.

In some cases, a self-attention block and a cross-attention block are added to each style block. Accordingly, the increased convolution capacity of image generation network 725 enables image generation network 725 to generate a high-resolution image at a high speed.

In the machine learning field, an attention mechanism is a method of placing differing levels of importance on different elements of an input. Calculating attention may involve three basic steps. First, a similarity between query and key vectors obtained from the input is computed to generate attention weights. Similarity functions used for this process can include dot product, splice, detector, and the like. Next, a softmax function is used to normalize the attention weights. Finally, the attention weights are weighed together with their corresponding values. In the context of an attention network, the key and value are typically vectors or matrices that are used to represent the input data. The key is used to determine which parts of the input the attention mechanism should focus on, while the value is used to represent the actual data being processed.

Figure 8:
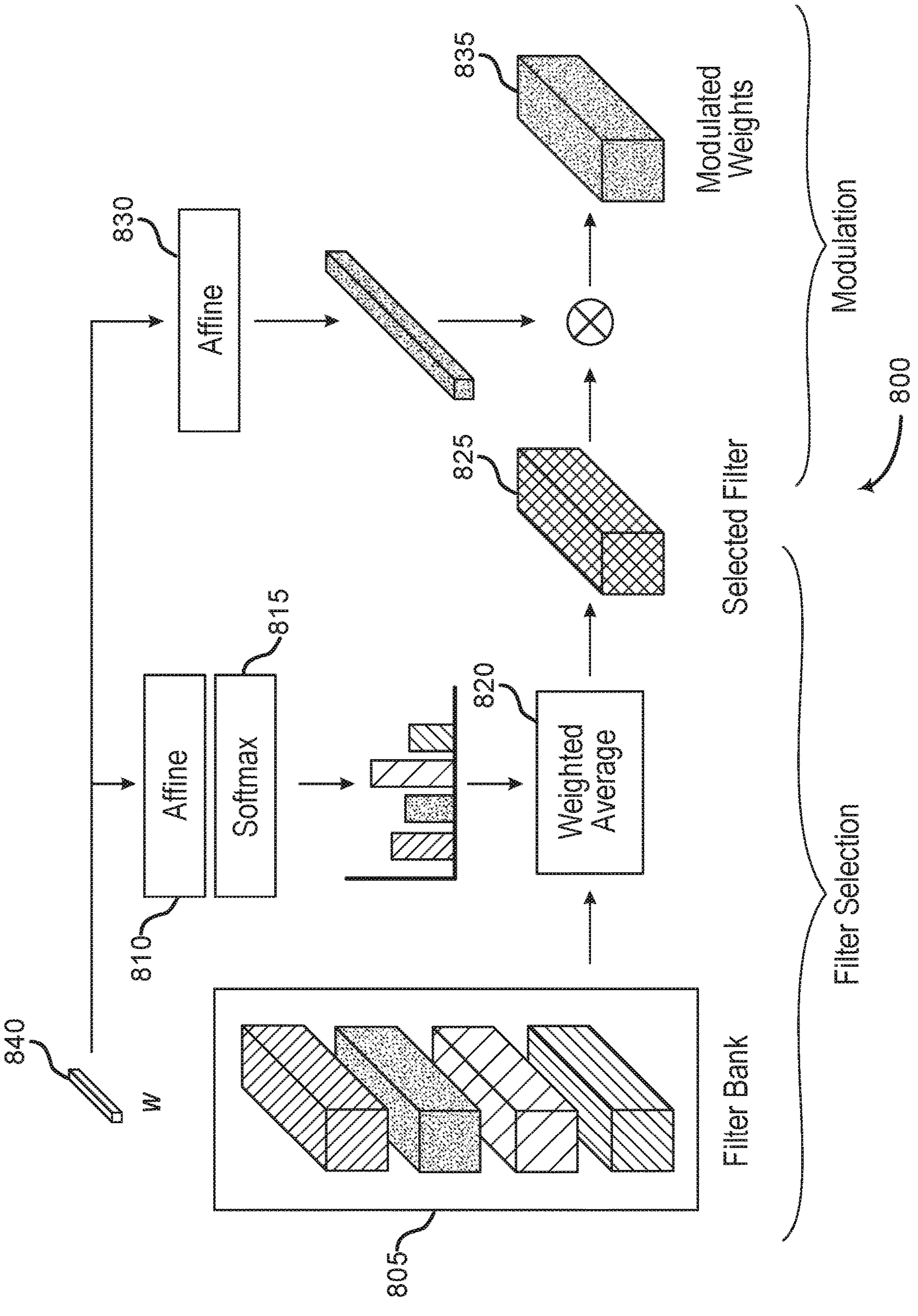
FIG. 8 shows an example of sample-adaptive kernel selection according to aspects of the present disclosure.

FIG. 8 shows an example of sample-adaptive kernel selection 800 according to embodiments of the present disclosure. The example shown includes filter bank 805, first affine operation 810, softmax 815, weighted average 820, selected filter 825, second affine operation 830, modulated weights 835, and style vector 840.

The distribution of low-resolution images, provided as input to the image processing apparatus, is highly diverse. Accordingly, the present disclosure describes systems and methods to enhance the capacity of convolution kernels. In some cases, the parameters of image generation network 725 include more expressivity as a result of dynamically selected convolution filters based on the input conditioning.

The image generation apparatus is configured to increase the expressivity of convolutional kernels. The image generation apparatus creates convolutional kernels based on the text conditioning. In an embodiment, the kernel selection method includes instantiating filter bank 805 that takes a feature from a feature map as input (e.g., feature map 770 in FIG. 7). Next, style vector 840 goes through first affine operation 810 followed by softmax 815 to predict weighted average 820 across the filters to generate selected filter 825. As shown in FIG. 8, selected filter 825 is used in the convolution pipeline of the image generation network with second affine operation 830 for weight de-modulation to generate modulated weights 835.

Accordingly, the filter selection process is performed once at each layer. The kernel selection method includes convolution filters that dynamically change per sample. In some cases, the kernel selection method instantiates a large filter bank 805 and selects weights from a separate pathway conditional on the w-space (style vector space) of StyleGAN model. In some cases, softmax-based weighting is a differentiable filter selection process based on input conditioning.

Figure 9:
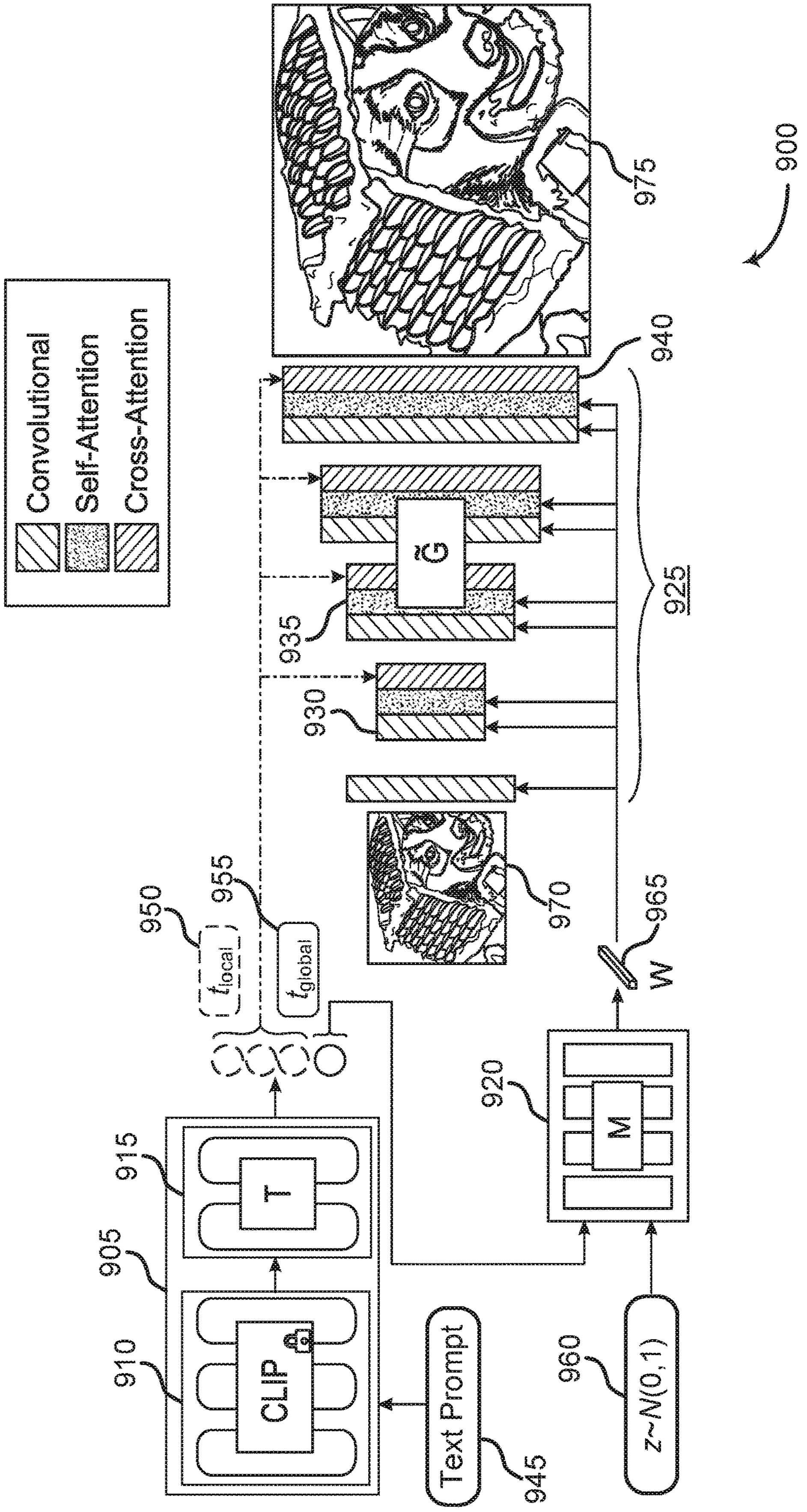
FIGS. 9 and 10 show examples of a machine learning model for image super-resolution according to aspects of the present disclosure.

FIG. 9 shows an example of a machine learning model 900 for image super-resolution according to aspects of the present disclosure. The example shown includes machine learning model 900, text encoder network 905, mapping network 920, image generation network 925, text prompt 945, local vectors 950, global vector 955, noise vector 960, style vector 965, low-resolution image 970, and high-resolution image 975. Machine learning model 900 is an example of, or includes aspects of, the corresponding element described with reference to FIGS. 5, 7, and 10.

Machine learning model 900 is a GAN-based upsampler. In some cases, the upsamplers for large-scale models perform large factors of upsampling by leveraging a text description. Machine learning model 900 (that includes the GAN-based upsampler) is faster than a diffusion-based upsampler. Machine learning model 900 includes text encoder network 905, mapping network 920, and image generation network 925.

Text encoder network 905 takes text prompt 945 as input and generates local vectors 950 and global vector 955. Text encoder network 905 includes a pretrained encoder 910 (e.g., CLIP text encoder) and a learned encoder 915 for generating the local vectors 950 and the global vector 955. In an embodiment, learned encoder 915 includes two transformer layers.

Text encoder network 905 is an example of, or includes aspects of, the corresponding element described with reference to FIGS. 5, 7, and 10. In one embodiment, text encoder network 905 includes pretrained encoder 910 and learned encoder 915. Text prompt 945 is an example of, or includes aspects of, the corresponding element described with reference to FIGS. 7, 10, and 16. Pretrained encoder 910 is an example of, or includes aspects of, the corresponding element described with reference to FIG. 7. Learned encoder 915 is an example of, or includes aspects of, the corresponding element described with reference to FIG. 7.

In an embodiment, global vector 955 and noise vector 960 are input to mapping network 920 to generate style vector 965. Mapping network 920 includes four MLP layers. Style vector is denoted as vector w. Mapping network 920 is an example of, or includes aspects of, the corresponding element described with reference to FIGS. 5-7, 10, and 16.

Global vector 955 is an example of, or includes aspects of, the corresponding element described with reference to FIGS. 7 and 10. Noise vector 960 is an example of, or includes aspects of, the corresponding element described with reference to FIGS. 7 and 10. Style vector 965 is an example of, or includes aspects of, the corresponding element described with reference to FIGS. 7 and 10.

Image generation network 925 increases performance of the image processing apparatus by integrating attention layers with the convolutional backbone of StyleGAN. In some cases, the image generation network applies the Lipschitz L2-dist attention for both self-attention and cross-attention. Image generation network 925 further increases stability of the image processing apparatus by combining the key and query matrix, and applying weight decay to the key and query matrix. Image generation network 925 is an example of, or includes aspects of, the corresponding element described with reference to FIGS. 5, 7, 10, and 16.

According to an embodiment, image generation network 925 includes a set of processing blocks/units. A processing block/unit includes convolution layer 930, self-attention layer 935, and cross-attention layer 940. The processing block is shown as a three-strip block comprising convolution layer 930, self-attention layer 935, and cross-attention layer 940. Image generation network 925 interleaves self-attention layer 935 with convolutional layer 930, leveraging the style vector 965 (denoted as w) as an additional token. At each attention block, image generation network 925 adds a separate cross-attention layer 940 to attend to the set of local vectors 950. Self-attention layer 935 is an example of, or includes aspects of, the corresponding element described with reference to FIG. 7. Cross-attention layer 940 is an example of, or includes aspects of, the corresponding element described with reference to FIG. 7. Local vector(s) 950 is an example of, or includes aspects of, the corresponding element described with reference to FIGS. 7 and 10.

According to an embodiment, image generation network 925 applies a few downsampling layers followed by upsampling layers. In some cases, image generation network 925 includes a series of upsampling convolutional layers, where convolutional layer 930 is enhanced with the sample-adaptive kernel selection (as described with reference to FIGS. 8 and 14), followed by attention layers. Thus, image generation network 925 takes low-resolution image 970 as input and generates high-resolution image 975 that matches text prompt 945. Low-resolution image 970 is an example of, or includes aspects of, the corresponding element described with reference to FIGS. 4 and 10. High-resolution image 975 is an example of, or includes aspects of, the corresponding element described with reference to FIGS. 4 and 10.

Figure 10:
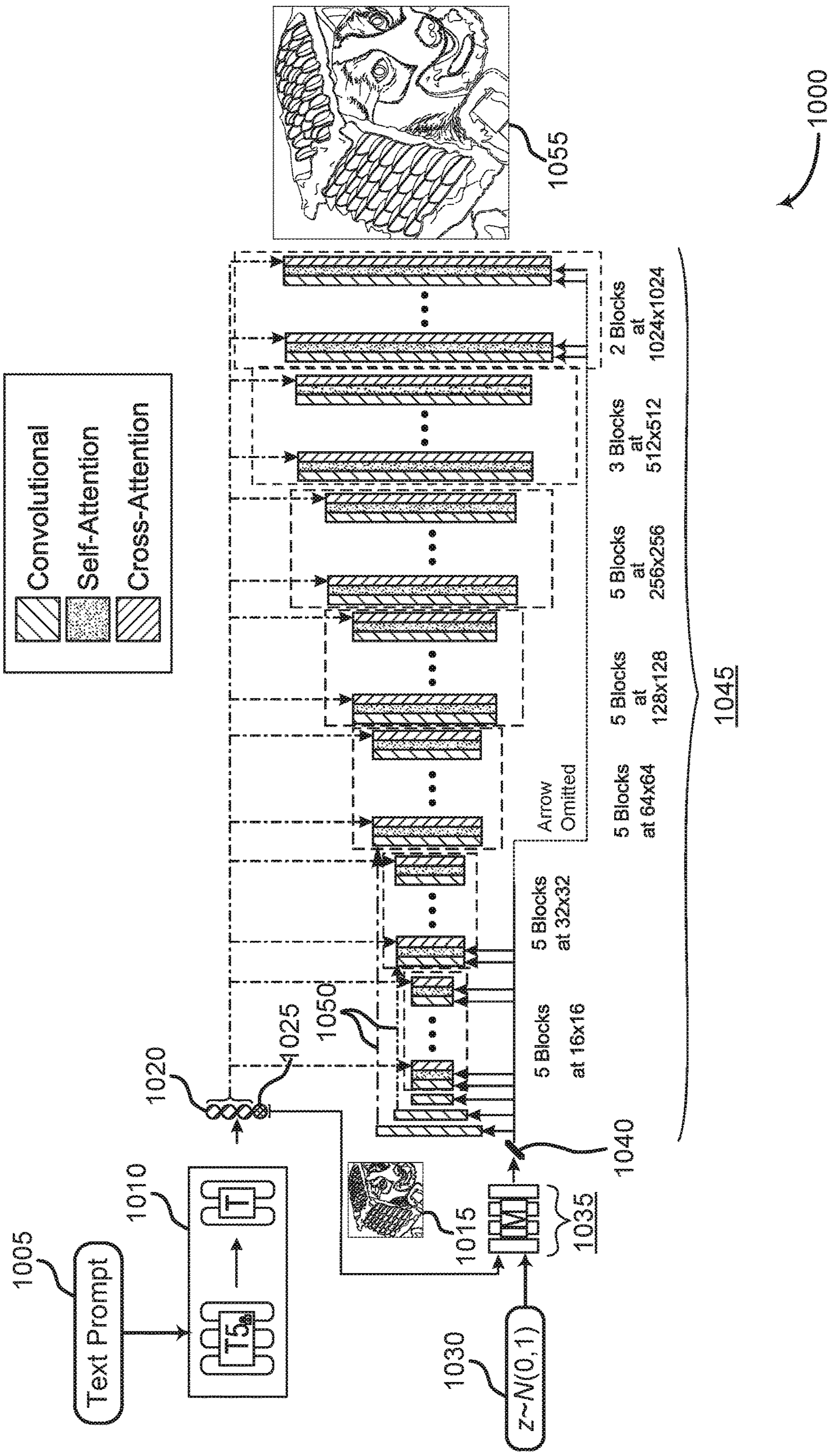

FIG. 10 shows an example of a machine learning model 1000 for image super-resolution according to embodiments of the present disclosure. The example shown includes machine learning model 1000, text prompt 1005, text encoder network 1010, low-resolution image 1015, local vectors 1020, global vector 1025, noise vector 1030, mapping network 1035, style vector 1040, image generation network 1045, and high-resolution image 1055. Machine learning model 1000 is an example of, or includes aspects of, the corresponding element described with reference to FIGS. 5, 7, and 9. FIG. 10 illustrates more details with regards to the configuration and elements or sub-components inside image generation network 1045. Machine learning model 1000 is the same model as described in FIG. 9. Repeated descriptions are omitted for brevity.

Text prompt 1005 is an example of, or includes aspects of, the corresponding element described with reference to FIGS. 7, 9, and 16. Text encoder network 1010 is an example of, or includes aspects of, the corresponding element described with reference to FIGS. 5, 7, and 9. Local vectors 1020 is an example of, or includes aspects of, the corresponding element described with reference to FIGS. 7 and 9. Global vector 1025 is an example of, or includes aspects of, the corresponding element described with reference to FIGS. 7 and 9. Noise vector 1030 is an example of, or includes aspects of, the corresponding element described with reference to FIGS. 7 and 9. Mapping network 1035 is an example of, or includes aspects of, the corresponding element described with reference to FIGS. 5-7, 9, and 16. Style vector 1040 is an example of, or includes aspects of, the corresponding element described with reference to FIGS. 7 and 9.

According to some embodiments, image generation network 1045 learns a high-capacity 64-pixel base model and then trains a 64-pixel to 512-pixel GAN-based upsampler.

As an example shown in FIG. 10, image generation network 1045 is rearranged to an asymmetric U-Net architecture, where the input low-resolution image 1015 (64-pixel image) passes through 3 downsampling residual blocks and then 6 upsampling residual blocks with attention layers to generate the high-resolution image 1055 (512-pixel image). Low-resolution image 1015 is an example of, or includes aspects of, the corresponding element described with reference to FIGS. 4 and 9. Image generation network 1045 is an example of, or includes aspects of, the corresponding element described with reference to FIGS. 5, 7, 9, and 16. High-resolution image 1055 is an example of, or includes aspects of, the corresponding element described with reference to FIGS. 4 and 9.

The depth of the image generation network is increased by adding more blocks at each layer. As an example shown in FIG. 10, the layer at 16-pixel includes 5 blocks of the interleaved attention and convolutional layers. Here, 16-pixel means 16-by-16 pixels. The layer at 32-pixel includes 5 blocks of the interleaved attention and convolutional layers. Similarly, layers at 64-pixel, 128-pixel, and 256-pixel include 5 blocks of the interleaved attention and convolutional layers. The layers at 512-pixel and 1024-pixel include 3 blocks and 2 blocks, respectively, of the interleaved attention and convolutional layers. According to an embodiment, image generation network 1045 includes skip connections 1050. In some cases, skip connections 1050 in the asymmetric U-Net architecture exist between layers at the same resolution. For example, image generation network 1045 includes downsampling residual blocks and then upsampling residual blocks, where a layer of the downsampling residual blocks is connected to a layer of the upsampling residual blocks by a skip connection in a U-net architecture.

Image generation network 1045 takes the style vector and a low-resolution image as input and applies a downsampling process followed by an upsampling process to generate a high-resolution image. According to an embodiment, image generation network 1045 includes 3 downsampling layers and 7 upsampling layers/units (from 16×16 to 1024×1024). The number of downsampling and upsampling layers/units can vary (i.e., not limited to 3 downsampling layers and 7 upsampling layers). The first downsampling layer has a skip connection to the second upsampling layer (32×32). The second downsampling layer has a skip connection to the third upsampling layer (64×64).

In an embodiment, local vectors 1020 are input to each cross-attention layer in a processing block at a certain resolution. For example, local vectors 1020 are input to each of the five blocks at resolution 16×16. Local vectors 1020 are input to each of the five blocks at resolution 32×32, and so on. Style vector 1040 is input to each convolution layer and each cross-attention layer. For example, style vector 1040 is input to each of the five blocks at resolution 16×16. Style vector 1040 is input to each of the five blocks at resolution 32×32, and so on.

In some embodiments, machine learning model 1000 includes a pretrained CLIP text encoder, a learned text encoder, and applies the Lipschitz L2-dist attention for both self-attention and cross-attention. Image generation network 1045 takes the low-resolution input image as input, and applies one or more downsampling layers followed by one or more upsampling layers (making the model a U-Net architecture).

The trained model enables a user interface that takes in a text prompt from the user, and shows the generated images matching the text prompt. In an embodiment, image generation network 1045 can generate images larger than 1024 px. The model is trained to super-res inputs to 1024 px resolution, it can generalize to creates results that are even higher resolution by re-applying the super-resolution model repeatedly. For example, to generate a 3072 px image, the 128 px input image is upsampled (via super-resolution) to 1024 px resolution by applying the model once (upscaling factor of 8×). The 1024 px output is resized to 384 px resolution using bicubic resampling. The super-resolution model is applied again to produce the 3072 px=384 px×8 image.

Image Generation

In FIGS. 11-14, a method, apparatus, and non-transitory computer readable medium for image processing is described. One or more embodiments of the method, apparatus, and non-transitory computer readable medium include obtaining a low-resolution image and a text description of the low-resolution image; generating a style vector representing the text description of the low-resolution image; generating an adaptive convolution filter based on the style vector; and generating a high-resolution image corresponding to the low-resolution image based on the adaptive convolution filter.

Some examples of the method, apparatus, and non-transitory computer readable medium further include encoding the text description of the low-resolution image to obtain a text embedding. Some examples further include transforming the text embedding to obtain a global vector corresponding to the text description as a whole and a plurality of local vectors corresponding to individual tokens of the text description, wherein the style vector is generated based on the global vector and the high-resolution image is generated based on the plurality of local vectors.

Some examples of the method, apparatus, and non-transitory computer readable medium further include performing a cross-attention process based on the plurality of local vectors, wherein the high-resolution image is generated based on the cross-attention process.

Some examples of the method, apparatus, and non-transitory computer readable medium further include obtaining a noise vector, wherein the style vector is based on the noise vector. Some examples of the method, apparatus, and non-transitory computer readable medium further include encoding the low-resolution image to obtain an image embedding, wherein the style vector is generated based on the image embedding.

Some examples of the method, apparatus, and non-transitory computer readable medium further include generating a feature map based on the low-resolution image. Some examples further include performing a convolution process on the feature map based on the adaptive convolution filter, wherein the high-resolution image is generated based on the convolution process. Some examples of the method, apparatus, and non-transitory computer readable medium further include performing a self-attention process based on the feature map, wherein the high-resolution image is generated based on the self-attention process.

Some examples of the method, apparatus, and non-transitory computer readable medium further include identifying a plurality of predetermined convolution filters. Some examples further include combining the plurality of predetermined convolution filters based on the style vector to obtain the adaptive convolution filter.

Figure 11:
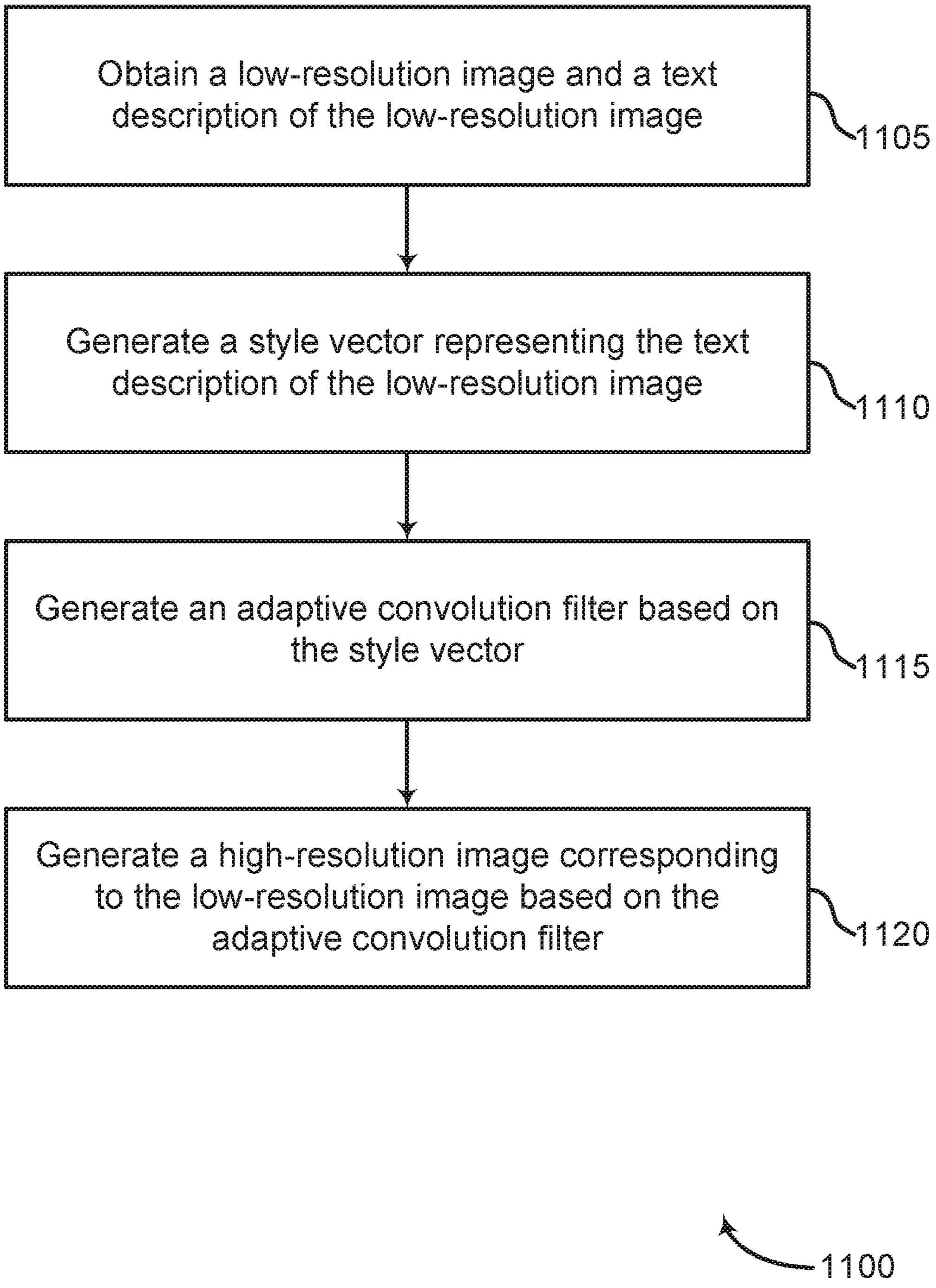
FIG. 11 shows an example of a method for image processing according to aspects of the present disclosure.

FIG. 11 shows an example of a method 1100 for image processing according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

According to an embodiment of the present disclosure, a text encoder network is configured to take a text description from a user as input. For example, the text encoder network including a pretrained CLIP text encoder and a learned text encoder, generates a text embedding corresponding to the text description. The mapping network then generates a style vector based on the text embedding that represents the low-resolution image (64-pixel-by-64-pixel) provided by the user. The image generation network includes integrating attention layers with the convolutional block of the backbone of StyleGAN2. In some examples, the image generation network takes the style vector and a low-resolution image as input and applies a downsampling process followed by an upsampling process to generate a high-resolution image.

Referring to FIG. 11, at operation 1105, the system obtains a low-resolution image and a text description of the low-resolution image. For example, the low-resolution image and text description may be provided as input by the user. In some cases, the operations of this step refer to, or may be performed by, a machine learning model as described with reference to FIGS. 5, 7, 9, and 10. In some examples, text description is a text prompt that provides information on the image desired by the user. A text encoder network is used to generate a global vector and local vectors from the text description.

At operation 1110, the system generates a style vector representing the text description of the low-resolution image. For example, style vector 965, as described with reference to FIG. 9, for the text description can be represented as w. In some cases, the operations of this step refer to, or may be performed by, a mapping network as described with reference to FIGS. 5-7, 9, 10, and 16.

According to the embodiments of the present disclosure, mapping network is a deep learning neural network comprised of fully connected layers. In some cases, the mapping network takes a randomly sampled point from the input latent space, such as latent vector, as input and performs reduced encoding of the input. In some examples, mapping network 920, as described with reference to FIG. 9, takes a noise vector and the global vector (generated based on the text description) as input and generates a style vector as output based on the reduced encoding. For example, the mapping network $w=M(z, c)$ maps the inputs into a style vector w.

At operation 1115, the system generates an adaptive convolution filter based on the style vector. In some cases, the operations of this step refer to, or may be performed by, an adaptive convolution component as described with reference to FIG. 5. In some cases, the adaptive convolution component is included in the image generation network.

According to an embodiment, a sample-adaptive kernel selection process is performed once at each layer of the image generation network to generate an adaptive convolution filter. The sample-adaptive kernel selection process instantiates a large filter bank and selects weights from a separate pathway conditional on the w-space of StyleGAN to dynamically change convolution filters per sample. Further details regarding the sample-adaptive kernel selection process are described with reference to FIGS. 8 and 14.

At operation 1120, the system generates a high-resolution image corresponding to the low-resolution image based on the adaptive convolution filter. In some cases, the operations of this step refer to, or may be performed by, an image generation network as described with reference to FIGS. 5, 7, 9, 10, and 16.

According to an embodiment, the image generation network predicts an output image $x=\tilde{G}(w)$, where w is the style vector. In some cases, the image generation network maps a learned constant tensor to an output image x conditioned on w in the original StyleGAN. The architecture of image generation network G consists of a series of upsampling convolutional layers modulated by the style vector w. In some cases, the convolutional layers are enhanced based on the sample-adaptive kernel selection followed by attention layers. Convolution generates output pixels with the w vector to model conditioning.

Accordingly, the architecture of the image processing apparatus is based on a conditional version of StyleGAN2 that includes two networks $G=\tilde{G}\circ M$ (i.e., image generation network G and mapping network M). The present disclosure describes systems and methods to include more expressivity in the model parameterization by capturing long-range dependence via the attention mechanism and by dynamically selecting convolution filters based on the input conditioning. In some examples, the image processing apparatus can increase the expressivity of ConvNets.

Figure 12:
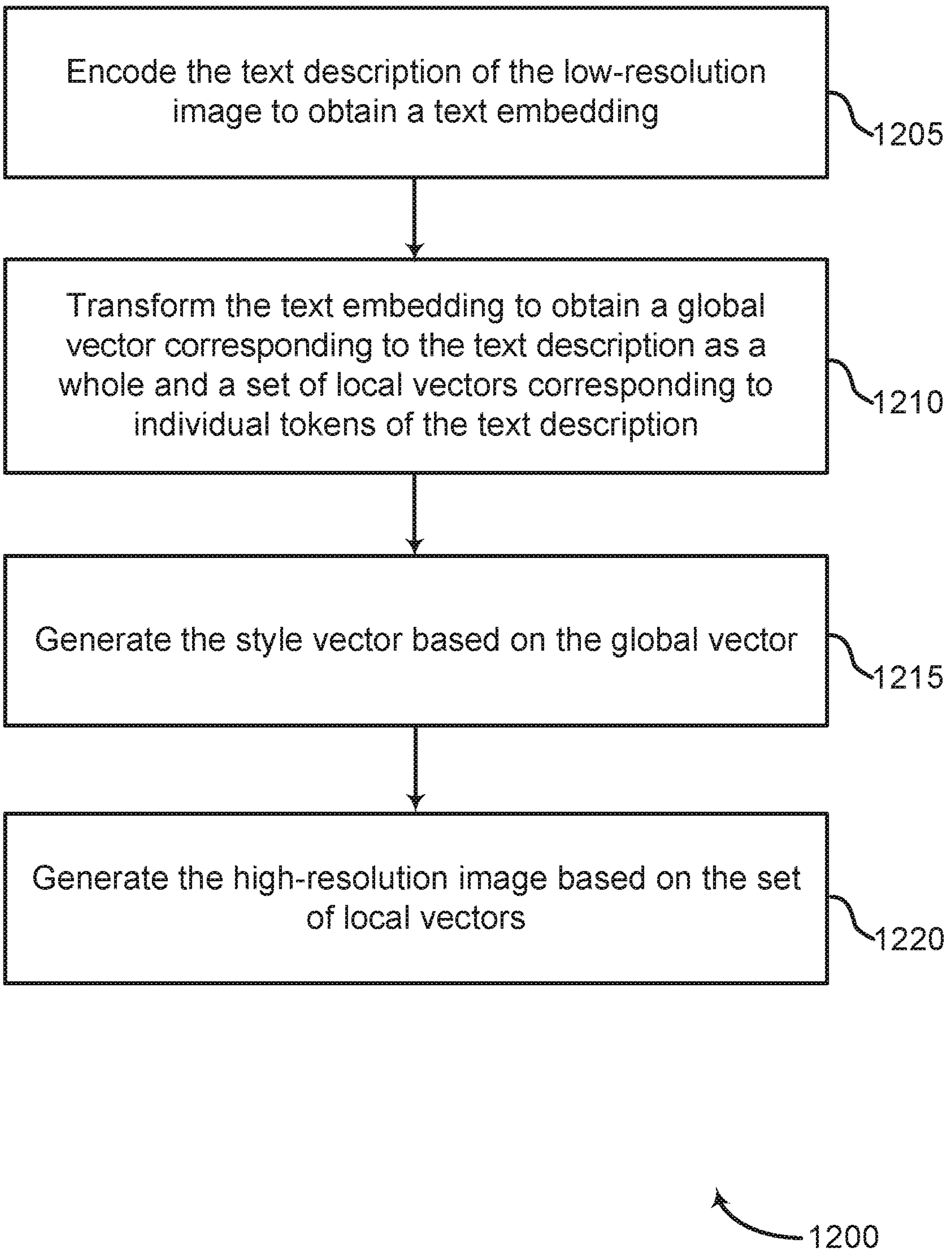
FIG. 12 shows an example of a method for generating a style vector according to aspects of the present disclosure.

FIG. 12 shows an example of a method 1200 for generating a style vector according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the system encodes the text description of the low-resolution image to obtain a text embedding. In some cases, the operations of this step refer to, or may be performed by, a text encoder network as described with reference to FIGS. 5, 7, 9, and 10.

The pretrained encoder of the text encoder network extracts the text embedding from a text prompt. In some examples, the text encoder network tokenizes the input prompt (after padding the input prompt to C=77 words) to produce conditioning vector $c\in\mathbb{R}^{C\times 1024}$ and take the features from the penultimate layer of a frozen CLIP feature extractor to leverage pretraining. The text encoder network applies additional attention layers to process the word embeddings before passing to the MLP-based mapping network for additional flexibility which results in text embedding $t=T(\mathrm{CLIP}(c))\in\mathbb{R}^{C\times 1024}$. An example of the pretrained encoder is CLIP. Other pretrained encoder can be used to replace CLIP. A learned encoder is denoted as T.

At operation 1210, the system transforms the text embedding to obtain a global vector corresponding to the text description as a whole and a set of local vectors corresponding to individual tokens of the text description. In some cases, the operations of this step refer to, or may be performed by, a text encoder network as described with reference to FIGS. 5, 7, 9, and 10.

According to an embodiment of the present disclosure, the text encoder network includes a pretrained encoder and a learned encoder. In some cases, the learned encoder obtains the text embedding from the pretrained encoder and generates a global vector and local vectors. Each component $t_i$ of t captures or corresponds to the embedding of the i-th word in the sentence. The embedding is referred to as $t_{local}=t_{\{1:C\}\backslash EOF}\in\mathbb{R}^{(C-1)\times1024}$. The EOF component of t aggregates global information and is called $t_{global}\in\mathbb{R}^{1024}$ Here, EOF refers to an end-of-file component or end-of-file token.

At operation 1215, the system generates the style vector based on the global vector. In some cases, the operations of this step refer to, or may be performed by, a mapping network as described with reference to FIGS. 5-7, 9, 10, and 16.

According to some embodiments, the MLP mapping network M processes the global text descriptor $t_{global}$ and the latent code $z\sim\mathcal{N}(0, 1)$ to extract the style $w=M(z, t_{global})$.

$$t_{local}, t_{global} = t = T(\text{CLIP}(c)) \tag{1}$$

$$w = M(z, t_{global})$$

In some cases, referring to equation (1) above, $t_{local}$ is referred to as a local vector. $t_{global}$ is referred to as a global vector. CLIP(c) is referred to as a text embedding. z is referred to as a noise vector. w is referred to as a style vector.

At operation 1220, the system generates the high-resolution image based on the set of local vectors. In some cases, the operations of this step refer to, or may be performed by, an image generation network as described with reference to FIGS. 5, 7, 9, 10, and 16. The mapping network uses the text-based style code w to modulate the image generation network (i.e., synthesis network G) and the word embeddings $t_{local}$ as features for cross-attention.

$$x = \tilde{G}(w, t_{local}) \tag{2}$$

The text-image alignment offers increased visual performance with cross-attention.

In some cases, the image generation network G includes cross-attention layers at each level to attend to the set of local vectors. Additionally, the style vector w modulates the image generation network by dynamically changing the convolutional layers based on the sample-adaptive kernel selection (described with reference to FIGS. 8 and 14). Thus, the image generation network G accurately captures the information in the local vectors and the style vector based on the text description. Image generation network G generates high-resolution images.

Figure 13:
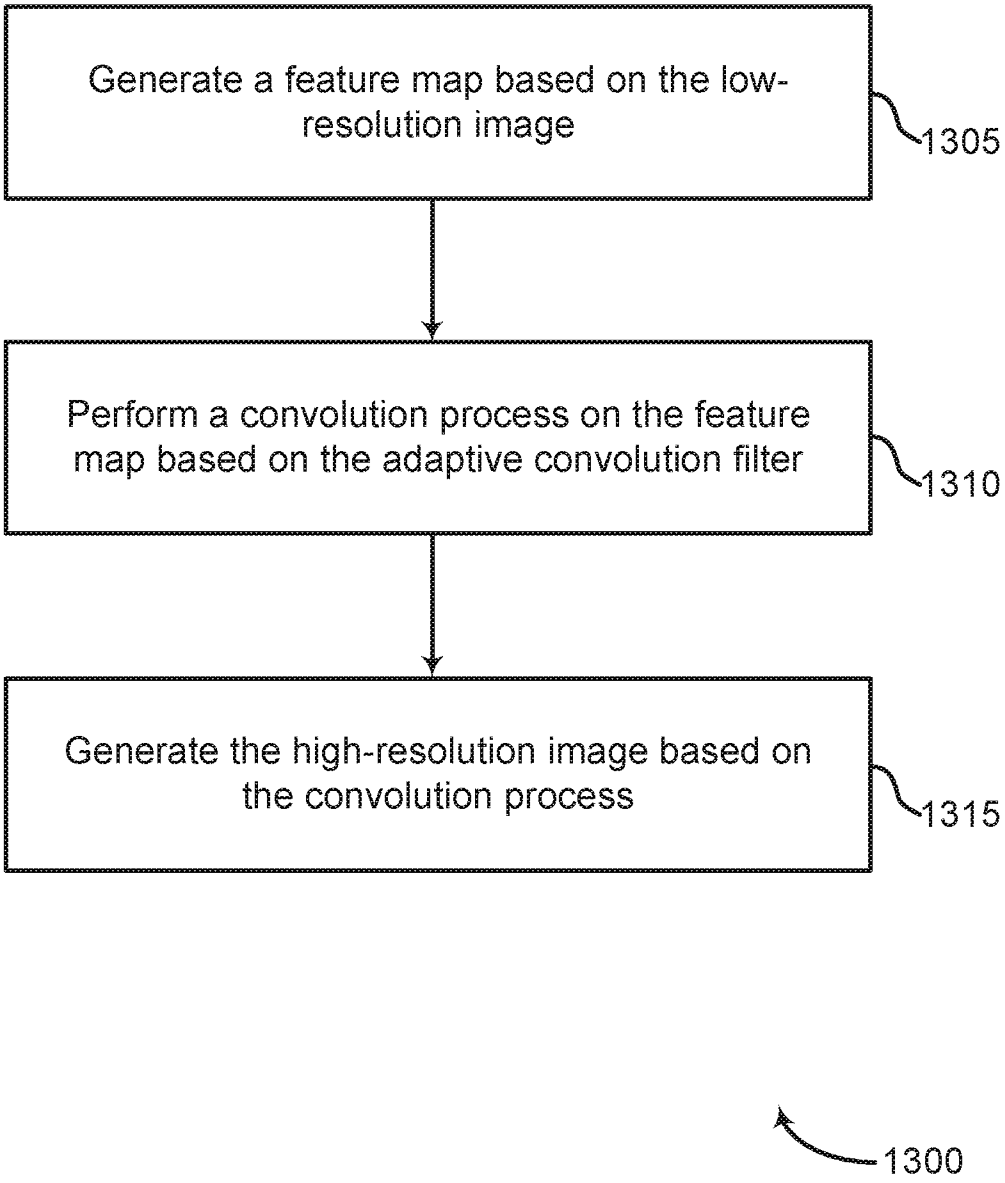
FIG. 13 shows an example of performing a convolution process according to aspects of the present disclosure.

FIG. 13 shows an example of a method 1300 for performing a convolution process according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1305, the system generates a feature map based on the low-resolution image. In some cases, the operations of this step refer to, or may be performed by, an image generation network as described with reference to FIGS. 5, 7, 9, 10, and 16. For example, a filter or feature detector helps identify different features present in a low-resolution image. In some examples, the image generation network applies the filter or feature detector to the low-resolution image to generate a feature map.

At operation 1310, the system performs a convolution process on the feature map based on the adaptive convolution filter. For example, performing the convolution process includes applying the adaptive convolution filter over the feature map. In some cases, performing the convolution process generates output that captures the learned features of the low-resolution images, and the high-resolution images may be generated based on the output. For example, the learned features of the low-resolution images may be features that the adaptive convolution filter has learned to recognize for a specific task, in contrast to the features in the feature map that are recognized based on a predetermined set of parameters. The output of the convolution process may be a representation of the low-resolution image in terms of the learned features that are relevant to the specific task. In some cases, the operations of this step refer to, or may be performed by, an image generation network as described with reference to FIGS. 5, 7, 9, 10, and 16.

A convolutional filter in conventional systems may not contextualize itself in relationship to distant parts of the images because the conventional convolutional filter operates within a receptive field. According to an embodiment, attention layers $g_{attention}$ are configured to incorporate such long-range relationships.

The image generation network can further increase performance by integrating attention layers with the convolutional backbone of StyleGAN. In some examples, the addition of attention layers to StyleGAN causes training to collapse since the dot-product self-attention is not Lipschitz. The Lipschitz continuity of the function defined by GAN models plays an important role in stable training. Thus, the image generation network uses the L2-distance as the attention logits to promote Lipschitz continuity. Furthermore, the image generation network matches the architectural details of StyleGAN, such as equalized learning rate and weight initialization from a unit normal distribution. Additionally, the image generation network scales down the L2-distance logits to approximately match the unit normal distribution at initialization, and reduces the residual gain from the attention layers leading to enhanced performance.

The image generation apparatus is configured to increase the expressivity of convolutional kernels. For example, the image generation apparatus creates the convolutional kernels based on the text conditioning. In some cases, sample-adaptive kernel selection method is used to dynamically change convolution filters per sample by selecting weights from a separate pathway conditional on the w-space of StyleGAN. Further details regarding the sample-adaptive kernel selection method are provided with reference to FIGS. 8 and 14.

The image generation network G further improves stability by tying or incorporating the key and query matrix, and applying weight decay to the key and query matrix. The image generation network G interleaves attention layers with each convolutional block, leveraging the style vector w as an additional token. At each attention block, the image generation network adds a separate cross-attention mechanism $g_{cross\text{-}attention}$ to attend to individual word embeddings.

The image generation network uses each input feature tensor as the query and the text embeddings as the key and value of the attention mechanism.

At operation 1315, the system generates the high-resolution image based on the convolution process. In some cases, the operations of this step refer to, or may be performed by, an image generation network as described with reference to FIGS. 5, 7, 9, 10, and 16. The image generation network can control the quality of the generated images via the convolution layer. The image generation network can generate different images using the convolution filters whose weights are adjusted based on the style vector.

Figure 14:
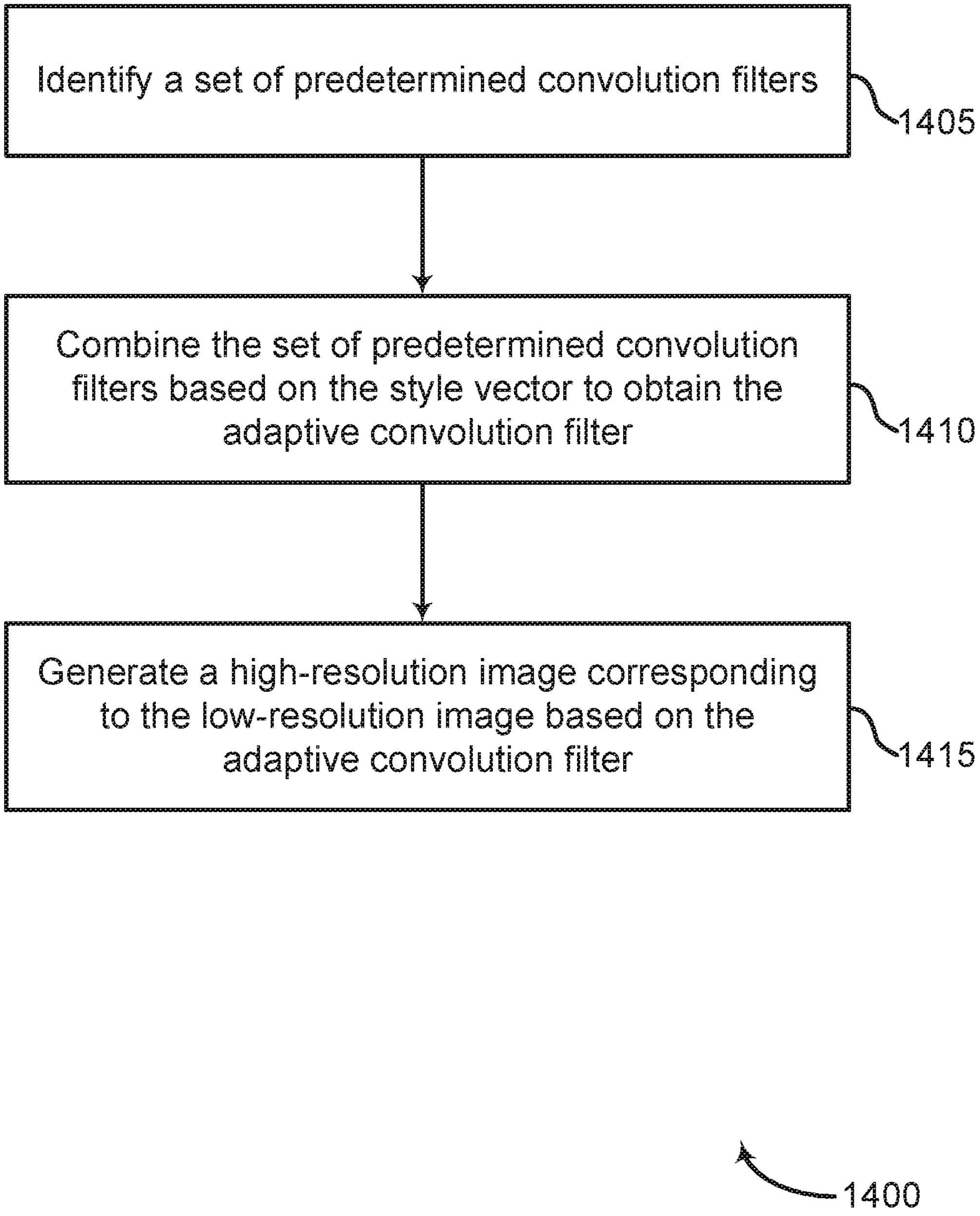
FIG. 14 shows an example of generating an adaptive convolution filter according to aspects of the present disclosure.

FIG. 14 shows an example of a method 1400 for generating an adaptive convolution filter according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

According to some embodiments, the image processing apparatus is configured to generate high-resolution images using a super-resolution text-to-image generation network. One or more embodiments of the present disclosure increase the capacity of convolutional kernels to account for high image diversity. The expressivity of the convolutional kernels is increased by performing a differentiable filter selection process to select weights based on the style vector. Thus, the style vector is used to modulate the image generation network using style-adaptive kernel selection method.

At operation 1405, the system identifies a set of predetermined convolution filters. In some cases, the operations of this step refer to, or may be performed by, an adaptive convolution component as described with reference to FIG. 5. In some cases, a convolution filter (or convolution kernel, or kernel) refers to a convolution matrix or mask that performs a convolution on an image to blur, sharpen, emboss, detect edges, and perform other functions on pixels of the image. In some cases, the convolution filter represents a function of each pixel in an output image to nearby pixels in an input image.

At operation 1410, the system combines the set of predetermined convolution filters based on the style vector to obtain the adaptive convolution filter. In some cases, the operations of this step refer to, or may be performed by, an adaptive convolution component as described with reference to FIG. 5.

According to an embodiment of the present disclosure, the image generation apparatus generates convolutional kernels based on text conditioning. The kernel selection method relates to instantiating a bank of N filters $$\{K_i \in \mathbb{R}^{C_{in} \times C_{out} \times K \times K}\}_{i=1}^{N},$$

(i.e., instead of one) that takes a feature $f \in \mathbb{R}^{C_{in}}$ at each layer. Next, the style vector $w \in \mathbb{R}^{d}$ goes through an affine layer $[W_{filt}, b_{filt}] \in \mathbb{R}^{(d+1) \times N}$ that predicts a set of weights to average across the filters to generate an aggregated filter $K \in \mathbb{R}^{C_{in} \times C_{out} \times K \times K}$.

$$K = \sum_{i=1}^{N} K_i \cdot \mathrm{softmax}\left(W_{filt}^{T} w + b_{filt}\right)_i \tag{3}$$

The aggregated filter is used in the convolution pipeline of StyleGAN2 with the second affine layer $[W_{mod}, b_{mod}] \in R^{(d+1) \times C_{in}}$ for weight (de-)modulation.

$$g_{adaconv}(f, w) = \left(\left(W_{mod}^{T} w + b_{mod}\right) \otimes K\right) * f \tag{4}$$

where $\otimes$ and $*$ represent (de-)modulation and convolution.

The softmax-based weighting is considered a differentiable filter selection process based on input conditioning at a high level. Furthermore, since the filter selection process is performed once at each layer, the selection process is significantly faster than the actual convolution which decouples compute complexity from the resolution. The kernel selection method is similar to dynamic convolutions such that the convolution filters dynamically change per sample. In some cases, the kernel selection method also differs from dynamic convolutions since the kernel selection method instantiates a large filter bank and selects weights from a separate pathway conditional on the w-space of StyleGAN.

At operation 1415, the system generates a high-resolution image corresponding to the low-resolution image based on the adaptive convolution filter. In some cases, the operations of this step refer to, or may be performed by, an image generation network as described with reference to FIGS. 5, 7, 9, 10, and 16.

The image generation network includes a series of upsampling convolutional layers. Each convolutional layer is enhanced with the adaptive kernel selection, followed by attention layers.

$$f_{\ell+1} = g^{\ell}_{cross\text{-}attention}\left(g^{\ell}_{attention}\left(g^{\ell}_{adaconv}(f_{\ell}, w), w\right), t_{local}\right) \tag{5}$$

In some cases, the network depth is increased by adding more blocks at each layer. Additionally, the dimensionality of z is reduced to 128 and style mixing and path length regularizers are turned off for enhanced performance in multi-category generation. Accordingly, the image generation component generates a high-resolution image corresponding to the low-resolution image.

Training and Evaluation

Figure 15:
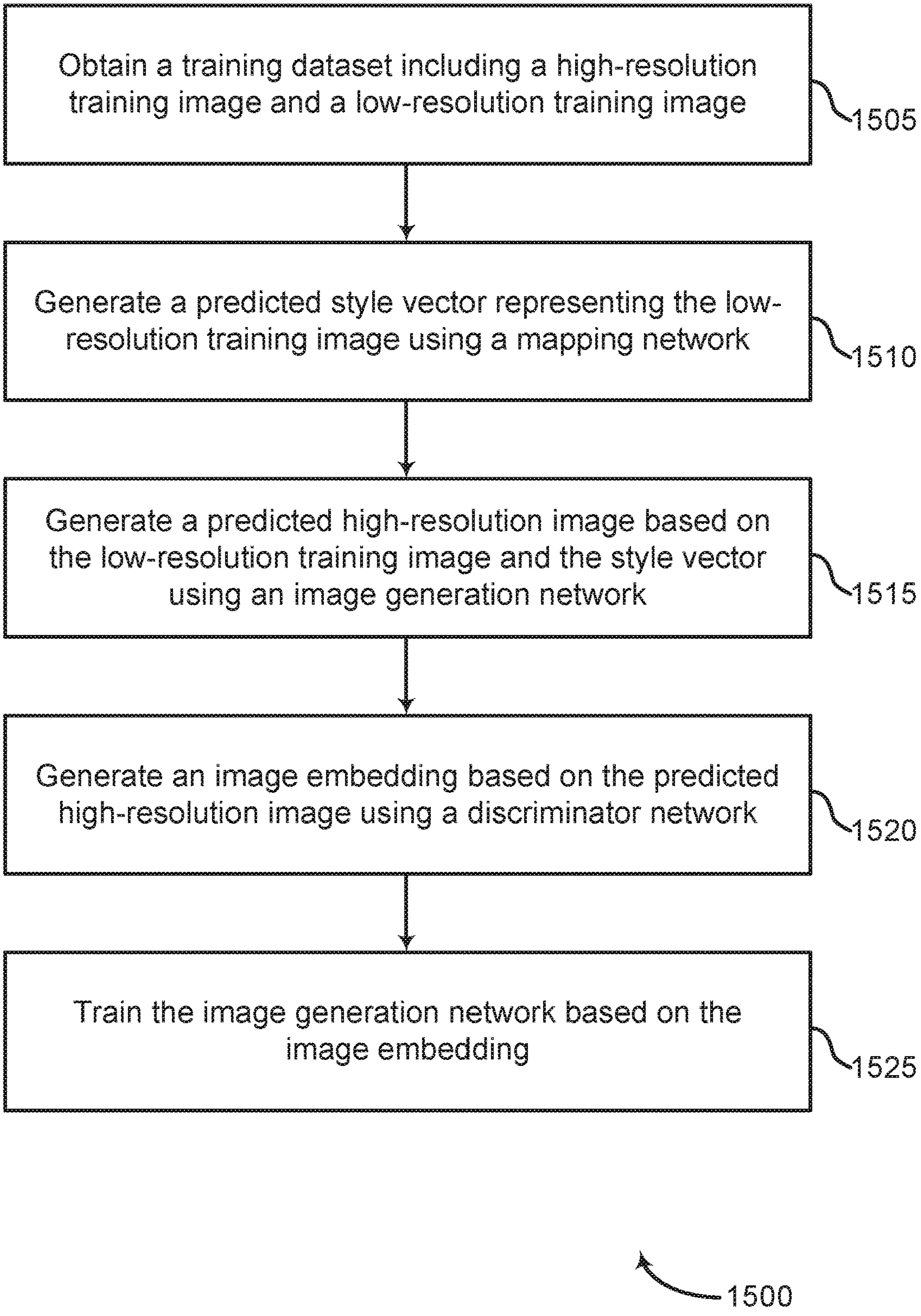
FIG. 15 shows an example of a method for training an image generation network according to aspects of the present disclosure.
Figure 16:
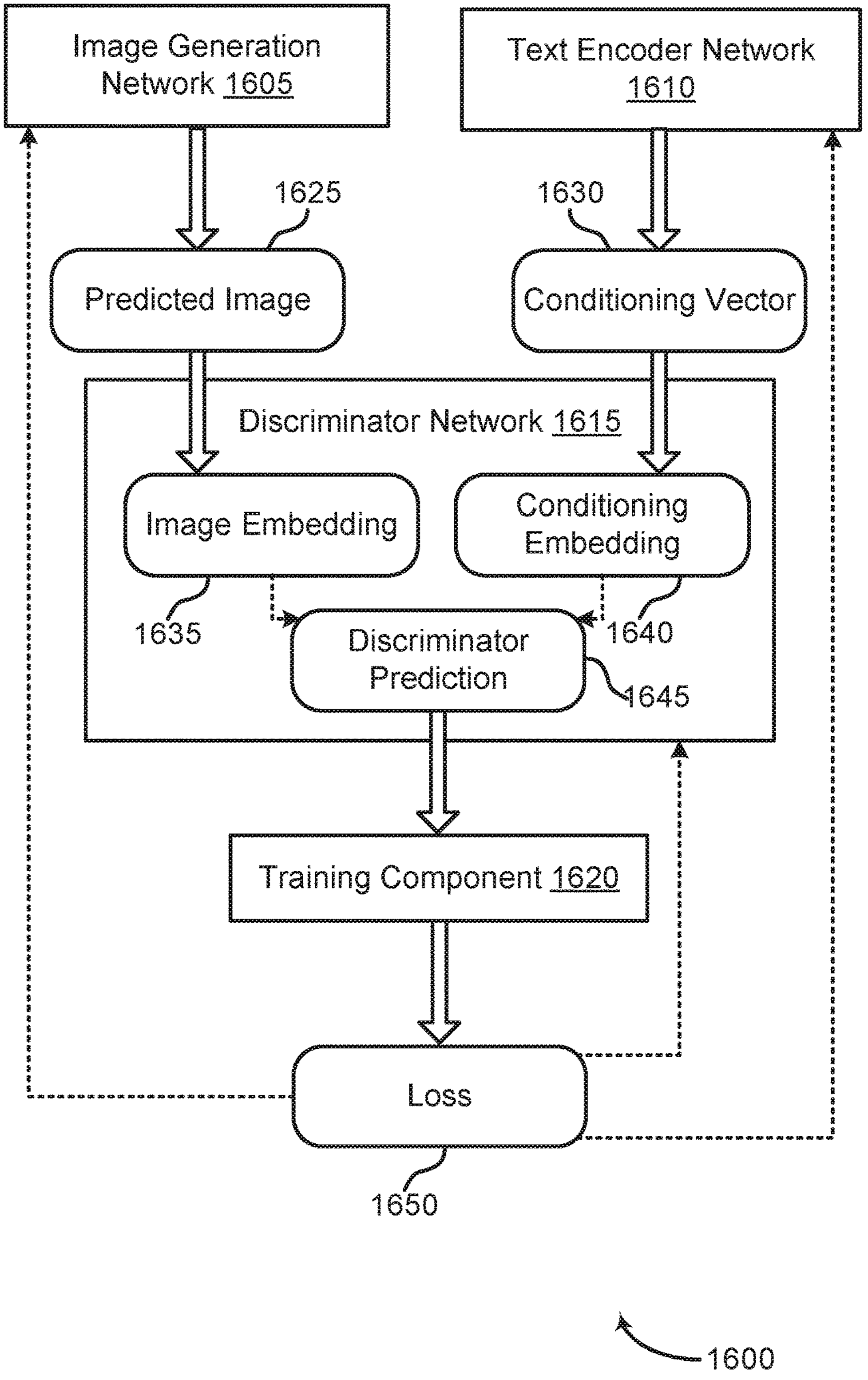
FIG. 16 shows an example of training a machine learning model according to aspects of the present disclosure.

In FIGS. 15-16, a method, apparatus, and non-transitory computer readable medium for image processing is described. One or more embodiments of the method, apparatus, and non-transitory computer readable medium include obtaining a training dataset including a high-resolution training image and a low-resolution training image; generating a predicted style vector representing the low-resolution training image using a mapping network; generating a predicted high-resolution image based on the low-resolution training image and the predicted style vector using an image generation network; generating an image embedding based on the predicted high-resolution image using a discriminator network; and training the image generation network based on the image embedding.

Some examples of the method, apparatus, and non-transitory computer readable medium further include computing a generative adversarial network (GAN) loss based on the image embedding, wherein the image generation network is trained based on the GAN loss.

Some examples of the method, apparatus, and non-transitory computer readable medium further include computing a perceptual loss based on the low-resolution training image and the predicted high-resolution image, wherein the image generation network is trained based on the perceptual loss.

Some examples of the method, apparatus, and non-transitory computer readable medium further include adding noise to the low-resolution training image using forward diffusion to obtain an augmented low-resolution training image, wherein the predicted high-resolution image is generated based on the augmented low-resolution training image.

Some examples of the method, apparatus, and non-transitory computer readable medium further include encoding text describing the low-resolution training image to obtain a text embedding using a text encoder network. Some examples further include generating a conditioning embedding based on the text embedding using the discriminator network, wherein the image generation network is trained based on the conditioning embedding.

FIG. 15 shows an example of a method 1500 for training an image generation network according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1505, the system obtains a training dataset including a high-resolution training image and a low-resolution training image. For example, the image processing apparatus learns a high-capacity 64-pixel base model (corresponding to low-resolution image) and then trains the 64-pixel to 512-pixel (corresponding to high-resolution image) GAN-based upsampler. Accordingly, the machine learning model is trained in two separate stages. In some cases, the operations of this step refer to, or may be performed by, a training component as described with reference to FIGS. 5 and 16.

Some embodiments apply augmentation to the input images during training. Two types of augmentations are applied to the input images during training. First, the training component applies randomized resize methods to generate the low resolution samples, by randomly choosing between bilinear, bicubic, and Lanczos resizing methods. Second, the training component injects random Gaussian noise to the input image by taking the forward (corruption) steps of the diffusion process, randomly sampled between 0% to 10%.

With regards to data augmentation via forward diffusion, diffusion models work by iteratively adding noise to the data during a forward process and then learning to recover the data by denoising the data during a reverse process. For example, during training, a guided latent diffusion model may take an original image in a pixel space as input and apply forward diffusion process to gradually add noise to the original image to obtain noisy images at various noise levels.

At operation 1510, the system generates a predicted style vector representing the low-resolution training image using a mapping network. For example, the mapping network takes a global vector obtained based on the text description and a noise vector as input and the mapping network predicts a style vector (i.e., the predicted style vector). In some cases, the operations of this step refer to, or may be performed by, a mapping network as described with reference to FIGS. 5-7, 9, 10, and 16.

At operation 1515, the system generates a predicted high-resolution image based on the low-resolution training image and the style vector using an image generation network. In some cases, the operations of this step refer to, or may be performed by, an image generation network as described with reference to FIGS. 5, 7, 9, 10, and 16.

According to an embodiment, the style vector is input to each convolutional layer of the image generation network (i.e., a synthesis network) to control the strength of the image features at different scales. In some cases, affine transform and softmax operation are performed to generate style vector that controls the layers of the image generation network. For example, the generated style vector is input to each convolution layer of the image generation network. The image generation network is trained by focusing on low-resolution images initially and then progressively shifting focus on high-resolution images.

At operation 1520, the system generates an image embedding based on the predicted high-resolution image using a discriminator network. In some cases, the operations of this step refer to, or may be performed by, a discriminator network as described with reference to FIGS. 5 and 16.

According to some embodiments of the present disclosure, the discrimination power of GAN is strengthened by ensembling a pretrained CLIP image encoder with an adversarial discriminator, e.g., a vision-aided discriminator. During training, the CLIP encoder may not be trained and the training component trains a series of linear layers connected to each of the convolution layers of the encoder using a non-saturating loss. In some examples, the vision-aided CLIP discriminator, compared to a traditional discriminator, backpropagates more informative gradients to the generator and improves the quality of the synthesized images.

At operation 1525, the system trains the image generation network based on the image embedding. In some cases, the operations of this step refer to, or may be performed by, a training component as described with reference to FIGS. 5 and 16. In some cases, the machine learning model is trained with the same losses as the base model, and trains the model with the LPIPS perceptual loss with respect to the ground truth high-resolution image. In some cases, vision-aided GAN may not be used for the upsampler. In some examples, the image processing apparatus is trained and inferenced with moderate Gaussian noise augmentation for reducing the gap between real images and GAN-generated images.

In some embodiments, the training process includes by first collecting high resolution image at 1024-px resolution and text caption pairs from external sources (e.g., the Internet). In an example, a combination of the LAION and COYO dataset is used, but other datasets can also be used as long as they contain text and image pairs.

Then the input image is resized to low resolution, such as 64×64 or 128×128. The machine learning model is trained to recover the original image from the low resolution input and the associated caption. At test time, the machine learning model applies on the outputs of the diffusion models, which are typically at 64×64 or 128×128 resolution. During training, the machine learning model is not trained with diffusion model outputs. Since there can be subtle visual difference between the resized real image and the diffusion model outputs, causing suboptimal performance, random augmentations are applied to the input image during training for better generalization.

FIG. 16 shows an example of for training a machine learning model according to embodiments of the present disclosure. The example shown includes training an image generation network (a generator) and a discriminator network (a discriminator). The example shown includes training process 1600, image generation network 1605, text encoder network 1610, discriminator network 1615, training component 1620, predicted image 1625, conditioning vector 1630, image embedding 1635, conditioning embedding 1640, discriminator prediction 1645, and loss function 1650.

Image generation network 1605 generates predicted image 1625 using a low-resolution input image. Similarly, text encoder network 1610 generates conditioning vector 1630 based on a text prompt. Image generation network 1605 and text encoder network 1610 are examples of, or includes aspects of, the corresponding element described with reference to FIGS. 5, 7, 9, and 10.

According to an embodiment of the present disclosure, the discriminator network 1615 includes a StyleGAN discriminator. Self-attention layers are added to the StyleGAN discriminator without conditioning. In some cases, a modified version of the projection-based discriminator network 1615 incorporates conditioning. Discriminator network 1615 is an example of, or includes aspects of, the corresponding element described with reference to FIG. 5.

According to an embodiment, discriminator network 1615 (also denoted as D(•,•)) includes two branches. A first branch is a convolutional branch $\phi(\cdot)$ that receives an RGB image x and generates an image embedding 1635 of the RGB image x (image embedding is denoted as $\phi(x)$). A second branch is a conditioning branch denoted as $\psi(\cdot)$. The conditioning branch receives conditioning vector 1630 (the conditioning vector is denoted as c) based on the text prompt. The conditioning branch generates conditioning embedding 1640 (conditioning embedding is also denoted as $\psi(c)$). Accordingly, discriminator prediction 1645 is the dot product of the two branches:

$$D(x, c) = \phi(x)^T \psi(c) \tag{6}$$

Training component 1620 calculates loss function 1650 based on discriminator prediction 1645 during training process 1600. In some examples, loss function 1650 includes a non-saturating GAN loss. Training component 1620 is an example of, or includes aspects of, the corresponding element described with reference to FIG. 5. The machine learning model is trained using GAN loss as follows:

$$\mathcal{L}_{GAN,real} = \underset{x,c\sim p_{data}}{E}\left[\log\left(1+\exp\left(-\phi(x)^T\psi(c)\right)\right)\right] \tag{7}$$

$$\mathcal{L}_{GAN,fake} = \underset{x,c\sim p_{fake}}{E}\left[\log\left(1+\exp\left(\phi(x)^T\psi(c)\right)\right)\right] \tag{8}$$

In some embodiments, discriminator prediction 1645 measures the alignment of the image x with the conditioning c. In some cases, a decision can be made without considering the conditioning c by collapsing conditioning embedding 1640 ($\psi(c)$) to the same constant irrespective of c. Discriminator network 1615 utilizes conditioning by matching $x_i$ with an unrelated condition $c_{j\neq i}$ taken from another sample in the minibatch $$\{(x_i, c_i)\}_i^N,$$

and presents the matching as fake images. The training component 1620 computes a mixing loss based on the image embedding and the mixed conditioning embedding, where the image generation network 1605 is trained based on the mixing loss. The mixing loss is referred to as $\mathcal{L}_{mixaug}$ formulated as follows:

$$\mathcal{L}_{mixaug} = \underset{\{(x_i,c_i)\}\sim p_{data}}{E}\left[\frac{1}{N-1}\sum_{j\neq i}\log\left(1+\exp\left(\phi(x_i)^T\psi(c_j)\right)\right)\right] \tag{9}$$

According to some embodiments, equation (9) above relates to the repulsive force of contrastive learning which encourages the embeddings to be uniformly spread across the space.

$$\underset{\{(x_i,c_i)\}_i}{E}\left[-\log\left(\frac{e^{\phi(x_i)^T\psi(c_i)}}{e^{\phi(x_i)^T\psi(c_i)}+\sum_{j\neq i}e^{\phi(x_i)^T\psi(c_j)}}\right)\right] = \underset{\{(x_i,c_i)\}_i}{E}\log\left(1+\sum_{j\neq i}\exp\left(\underbrace{\phi(x_i)^T\psi(c_j)}_{repulsive}-\underbrace{\phi(x_i)^T\psi(c_i)}_{attractive}\right)\right) \tag{10}$$

The two methods act to minimize similarity between unrelated image x and conditioning c, but the methods differ in that the logit of $\mathcal{L}_{mixaug}$ in Equation (9) is not pooled with other pairs inside the logarithm. In some cases, the formulation encourages stability and is not affected by hard-negatives of the batch. Accordingly, discriminator network 1615 generates an embedding based on the convolutions and input conditioning to train the image generation network 1605 that predicts a high-resolution image.

The image processing apparatus is evaluated using four different experiments. The first experiment shows that the image processing apparatus achieves competitive results on the ImageNet class-conditional synthesis task without relying on a pretrained ImageNet classifier. Second, the text-to-image synthesis results demonstrate that GANs generate results hundreds of times faster than diffusion or autoregressive models and hence are a viable option for the image generation task. Third, the GAN upsampling model can be combined with a diffusion model to accelerate the inference time of text-to-image synthesis. Lastly, the large-scale GANs include continuous and disentangled latent space manipulation of StyleGAN, enabling a new mode of image editing on image synthesis task.

The implementation of the machine learning model, as described in the present disclosure, is based on the StudioGAN library written in PyTorch, and the evaluation follows procedure of Studio-GAN with anti-aliasing PIL resizer, except otherwise noted. For text-to-image synthesis, in some examples, the machine learning model is trained on LAION2B-en and COYO-700M datasets. OpenCLIP ViT-H/14 is used for the pretrained text encoder and OpenAI ViT-B/32 for CLIP score calculation.

An embodiment of the present disclosure includes a class-conditional GAN trained on the ImageNet dataset. The machine learning model achieves generation quality comparable to generative models without a pretrained ImageNet classifier. In some cases, L2 self-attention, style-adaptive convolution kernel, and image-condition mixing are applied to the machine learning model and a wide synthesis network is used to train the base 64 px model with a batch size of 1024. Additionally, a separate 256 px class-conditional upsampler model is trained and combined with an end-to-end fine-tuning stage. Here, 64 px means 64 pixels while 256 px means 256 pixels.

In some cases, text-conditioning is added to StyleGAN2 and the configuration is tuned based on the findings of StyleGAN-XL. Next, the components, as described in the present disclosure, are added step-wise which consistently improve network performance. The model has high scalability, as the high-capacity version of the final formulation achieves improved metrics. The image processing apparatus achieves competitive performance when trained on a large model by increasing the capacity to 370M and batch size to 1248, which brings the parameter count similar to the smaller variant of Imagen.

In some embodiments, the image processing apparatus uses the 64 px base generator (as an example model shown in FIG. 7), trains with Vision-aided GAN, and applies a separate GAN upsampler model (shown in FIGS. 9-10) to produce images of 512×512 resolution for synthesis at higher resolution. There exist differences in the training dataset, the pretrained language model for extracting the text embeddings, and resolution. The outputs are resized to 256 px before running evaluation.

An embodiment of the present disclosure evaluates the performance of the GAN upsampler model. In some cases, the training component trains the GAN upsampler model on the ImageNet unconditional super-resolution task and compares performance with the diffusion-based models. The GAN upsampler model achieves maximum realism scores by a large margin.

In some cases, StyleGAN possesses a linear latent space for image manipulation, i.e., the W-space. An alternate embodiment of the disclosure performs coarse-grained and fine-grained style swapping using style vectors w. Embodiments of the present disclosure include an image processing apparatus that maintains a disentangled W-space which suggests that existing latent manipulation techniques of StyleGAN can transfer to the GAN upsampler model. Additionally, the GAN upsampler model possesses another latent space of text embedding $t=[t_{local}, t_{global}]$ prior to W. In some cases, the t-space can also be utilized. According to an example, 3 different (z, t) pairs are mixed and matched and decoded into images. The results show a clear separation between the constraints dictated by the text embedding t, and the remaining attributes (i.e., the pose of the character in this case) controlled by the noise vector z.

The image processing apparatus, as described in the present disclosure, scales up to sizes that enable text-to-image synthesis. Experiments and evaluation demonstrate results that achieve a visual quality competitive with autoregressive models and diffusion models trained with similar resources, while being orders-of-magnitude faster and enabling latent interpolation and stylization. The machine learning model enables a design space for large-scale generative models and has editing capabilities that are not equipped by autoregressive models or diffusion models.

Figure 17:
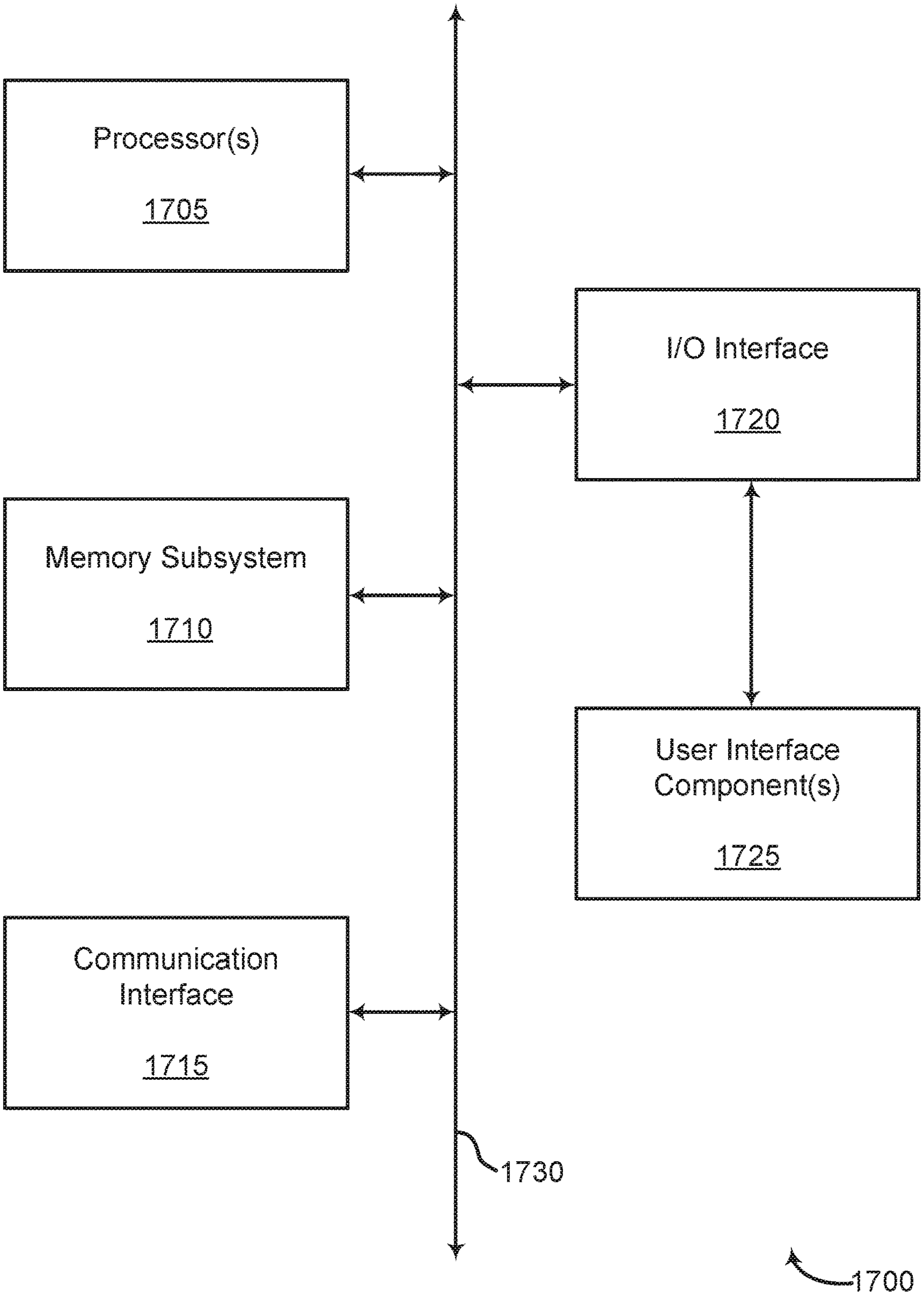
FIG. 17 shows an example of a computing device for image processing according to aspects of the present disclosure.

FIG. 17 shows an example of a computing device 1700 for image processing according to embodiments of the present disclosure. The example shown includes computing device 1700, processor 1705, memory subsystem 1710, communication interface 1715, I/O interface 1720, user interface component 1725, and channel 1730.

In some embodiments, computing device 1700 is an example of, or includes aspects of, image processing apparatus 500 of FIG. 5. In some embodiments, computing device 1700 includes one or more processors 1705 that can execute instructions stored in memory subsystem 1710 for obtaining a low-resolution image and a text description of the low-resolution image; generating a style vector representing the text description of the low-resolution image; generating an adaptive convolution filter based on the style vector; and generating a high-resolution image corresponding to the low-resolution image based on the adaptive convolution filter.

According to some embodiments, computing device 1700 includes one or more processors 1705. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some embodiments, memory subsystem 1710 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some embodiments, communication interface 1715 operates at a boundary between communicating entities (such as computing device 1700, one or more user devices, a cloud, and one or more databases) and channel 1730 and can record and process communications. In some cases, communication interface 1715 is provided to enable a processing system coupled to a transceiver (e.g., a transmitter and/or a receiver). In some examples, the transceiver is configured to transmit (or send) and receive signals for a communications device via an antenna.

According to some embodiments, I/O interface 1720 is controlled by an I/O controller to manage input and output signals for computing device 1700. In some cases, I/O interface 1720 manages peripherals not integrated into computing device 1700. In some cases, I/O interface 1720 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1720 or via hardware components controlled by the I/O controller.

According to some embodiments, user interface component(s) 1725 enable a user to interact with computing device 1700. In some cases, user interface component(s) 1725 include an audio device, such as an external speaker system, an external display device such as a display screen, an input device (e.g., a remote-control device interfaced with a user interface directly or through the I/O controller), or a combination thereof. In some cases, user interface component(s) 1725 include a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also, the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:

obtaining a low-resolution image and a text description, wherein the text description indicates a target style;

generating a text embedding representing the target style based on the text description;

modifying an image generation network by generating an adaptive convolution filter for the low-resolution image based on the text embedding, wherein the adaptive convolution filter comprises a convolution kernel for performing a convolution on the low-resolution image; and generating, using the modified image generation network, a high-resolution image corresponding to the low-resolution image by performing a convolution process on the low-resolution image using the adaptive convolution filter, wherein the high-resolution image depicts content from the low-resolution image with fine details based on the target style from the text description.

2. The method of claim 1, further comprising:

encoding the text description of the low-resolution image to obtain the text embedding;

transforming the text embedding to obtain a global vector corresponding to the text description as a whole and a plurality of local vectors corresponding to individual tokens of the text description; and generating a style vector based on the global vector, wherein the high-resolution image is generated based on the plurality of local vectors.

3. The method of claim 2, further comprising:

performing a cross-attention process based on the plurality of local vectors, wherein the high-resolution image is generated based on the cross-attention process.

4. The method of claim 2, further comprising:

obtaining a noise vector, wherein the style vector is based on the noise vector.

5. The method of claim 1, further comprising:

encoding the low-resolution image to obtain an image embedding; and generating a style vector based on the image embedding.

6. The method of claim 1, further comprising:

generating an image feature map based on the low-resolution image; and performing a self-attention process based on the image feature map, wherein the high-resolution image is generated based on the self-attention process.

7. The method of claim 1, further comprising:

identifying a plurality of predetermined convolution filters; and combining the plurality of predetermined convolution filters based on a style vector to obtain the adaptive convolution filter.

8. A system comprising:

a memory component; and a processing device coupled to the memory component, the processing device configured to perform operations comprising:

obtaining a low-resolution image and a text description, wherein the text description indicates a target style;

generating a text embedding representing the target style based on the text description;

modifying an image generation network by generating an adaptive convolution filter for the low-resolution image based on the text embedding, wherein the adaptive convolution filter comprises a convolution kernel for performing a convolution on the low-resolution image; and generating, using the modified image generation network, a high-resolution image corresponding to the low-resolution image by performing a convolution process on the low-resolution image using the adaptive convolution filter, wherein the high-resolution image depicts content from the low-resolution image with fine details based on the target style from the text description.

9. The system of claim 8, further comprising:

a text encoder network configured to encode the text description to obtain a global vector corresponding to the text description and a plurality of local vectors corresponding to individual tokens of the text description.

10. The system of claim 8, wherein:

the image generation network comprises a generative adversarial network (GAN).

11. The system of claim 8, wherein:

the image generation network includes a convolution layer, a self-attention layer, and a cross-attention layer.

12. The system of claim 8, wherein:

the image generation network includes a U-Net architecture.

13. The system of claim 8, further comprising:

a discriminator network configured to generate an image embedding and a conditioning embedding, wherein the discriminator network is trained together with the image generation network using an adversarial training loss based on the image embedding and the conditioning embedding.

14. The system of claim 8, wherein:

the image generation network includes an asymmetric U-Net architecture comprising a first number of downsampling residual blocks and a second number of upsampling residual blocks that is greater than the first number.

15. A non-transitory computer readable medium storing code for image processing, the code comprising instructions that, when executed by at least one processor, cause the at least one processor to perform operations comprising:

obtaining a low-resolution image and a text description, wherein the text description indicates a target style;

generating a text embedding representing the target style based on the text description;

modifying an image generation network by generating an adaptive convolution filter for the low-resolution image based on the text embedding, wherein the adaptive convolution filter comprises a convolution kernel for performing a convolution on the low-resolution image; and generating, using the modified image generation network, a high-resolution image corresponding to the low-resolution image by performing a convolution process on the low-resolution image using the adaptive convolution filter, wherein the high-resolution image depicts content from the low-resolution image with fine details based on the target style from the text description.

16. The non-transitory computer readable medium of claim 15, the code further comprising instructions executable by the at least one processor to perform operations comprising:

encoding the text description of the low-resolution image to obtain the text embedding;

transforming the text embedding to obtain a global vector corresponding to the text description as a whole and a plurality of local vectors corresponding to individual tokens of the text description; and generating a style vector based on the global vector, wherein the high-resolution image is generated based on the plurality of local vectors.

17. The non-transitory computer readable medium of claim 16, the code further comprising instructions executable by the at least one processor to perform operations comprising:

performing a cross-attention process based on the plurality of local vectors, wherein the high-resolution image is generated based on the cross-attention process.

18. The non-transitory computer readable medium of claim 15, the code further comprising instructions executable by the at least one processor to perform operations comprising:

encoding the low-resolution image to obtain an image embedding; and generating a style vector based on the image embedding.

19. The non-transitory computer readable medium of claim 15, the code further comprising instructions executable by the at least one processor to perform operations comprising:

identifying a plurality of predetermined convolution filters; and combining the plurality of predetermined convolution filters based on a style vector to obtain the adaptive convolution filter.

* * * * *